United States Patent
Tian et al.

(10) Patent No.: US 10,333,646 B2
(45) Date of Patent: Jun. 25, 2019

(54) MULTI-CHANNEL OPTICAL MULTIPLEXERS AND DEMULTIPLEXERS, OPTICAL TRANSMITTER, RECEIVER AND TRANSCEIVER COMPRISING THE SAME, AND METHODS OF MAKING AND USING THE SAME

(71) Applicant: Source Photonics (Chengdu) Company, Ltd., Chengdu (CN)

(72) Inventors: Chao Tian, West Hills, CA (US); Jian Yang, West Hills, CA (US); Shengzhong Zhang, West Hills, CA (US); Mark Heimbuch, West Hills, CA (US)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 72 days.

(21) Appl. No.: 15/503,692

(22) PCT Filed: Dec. 26, 2016

(86) PCT No.: PCT/CN2016/112120
§ 371 (c)(1),
(2) Date: Feb. 13, 2017

(87) PCT Pub. No.: WO2018/119580
PCT Pub. Date: Jul. 5, 2018

(65) Prior Publication Data
US 2018/0212708 A1    Jul. 26, 2018

Related U.S. Application Data

(60) Provisional application No. 62/402,578, filed on Sep. 30, 2016.

(51) Int. Cl.
*H04J 14/06* (2006.01)
*H04J 14/02* (2006.01)
(Continued)

(52) U.S. Cl.
CPC ............ *H04J 14/06* (2013.01); *G02B 27/141* (2013.01); *G02F 1/093* (2013.01); *H04B 10/40* (2013.01);
(Continued)

(58) Field of Classification Search
CPC ........ H04J 14/06; H04J 14/02; G02B 27/283; G02B 5/3083; G02B 27/141; H04B 10/503; H04B 10/40; G02F 1/093
(Continued)

(56) References Cited

U.S. PATENT DOCUMENTS 6,549,328 B2 * 4/2003 Aoki ...................... G02F 1/125
356/300
9,215,032 B2   12/2015 Zhang et al.
(Continued)

FOREIGN PATENT DOCUMENTS

CN    101984565 A    3/2011
CN    103502859 A    1/2014
(Continued)

OTHER PUBLICATIONS

International Search Report and Written Opinion; International Searching Authority/CN dated Aug. 29, 2017; International Application No. PCT/CN2016/112120; 8 pgs.; International Searching Authority/State Intellectual Property Office of the P.R. China; Beijing, China.

*Primary Examiner* — Kwang B Yao
*Assistant Examiner* — Syed M Bokhari
(74) *Attorney, Agent, or Firm* — Andrew D. Fortney; Central California IP Group, P.C.

(57) ABSTRACT

Optical multiplexers, optical demultiplexers, optical modules including the same, and methods of making and using the same are disclosed. The optical multiplexers include first and second structural blocks and a beam combiner. The first
(Continued)

and second structural blocks each include at least one mirror and at least one filter, and are configured to combine a plurality of individual optical signals into a multi-channel optical signal. The beam combiner includes one or more mirrors and one or more filters, and is configured to combine the multi-channel optical signals into a further multi-channel optical output signal having the same number of channels as the multi-channel optical signals. The optical demultiplexers are structurally similar to the optical multiplexers, but provide a complementary or reverse function. The present multiplexers and demultiplexers reduce skew and/or accumulation of the geometric error over the channels in the multi-channel optical signal output from the multiplexer or input into the demultiplexer.

25 Claims, 10 Drawing Sheets

(51) Int. Cl.
| | | |
|---|---|---|
| *H04B 10/40* | (2013.01) | |
| *G02F 1/09* | (2006.01) | |
| *G02B 27/14* | (2006.01) | |
| *H04B 10/50* | (2013.01) | |
| *G02B 27/28* | (2006.01) | |
| *G02B 5/30* | (2006.01) | |
| *G02B 27/30* | (2006.01) | |

(52) U.S. Cl.
CPC ............ *H04B 10/503* (2013.01); *H04J 14/02* (2013.01); *G02B 5/3083* (2013.01); *G02B 27/283* (2013.01); *G02B 27/30* (2013.01)

(58) Field of Classification Search
USPC .................. 370/300; 398/152, 65, 68, 45, 79
See application file for complete search history.

(56) References Cited

U.S. PATENT DOCUMENTS

| | | | |
|---|---|---|---|
| 2004/0033010 A1* | 2/2004 | McGuire, Jr. .......... | G02B 6/272 385/16 |
| 2005/0025483 A1* | 2/2005 | Gurevich ........... | G02B 6/29364 398/68 |
| 2009/0016725 A1* | 1/2009 | Chouzenoux ........... | H04J 14/02 398/79 |
| 2010/0209103 A1* | 8/2010 | Sakigawa ............ | G02B 6/4201 398/45 |
| 2012/0257902 A1* | 10/2012 | Deng ................... | H04B 10/506 398/152 |
| 2013/0195456 A1* | 8/2013 | Sorin ................... | H04B 10/504 398/65 |
| 2015/0318951 A1 | 11/2015 | Zhang et al. | |
| 2016/0269808 A1 | 9/2016 | Du et al. | |
| 2018/0164515 A1* | 6/2018 | Amit .................. | G02B 6/29365 |

FOREIGN PATENT DOCUMENTS

| | | |
|---|---|---|
| CN | 105739023 A | 7/2016 |
| CN | 106019486 A | 10/2016 |

* cited by examiner

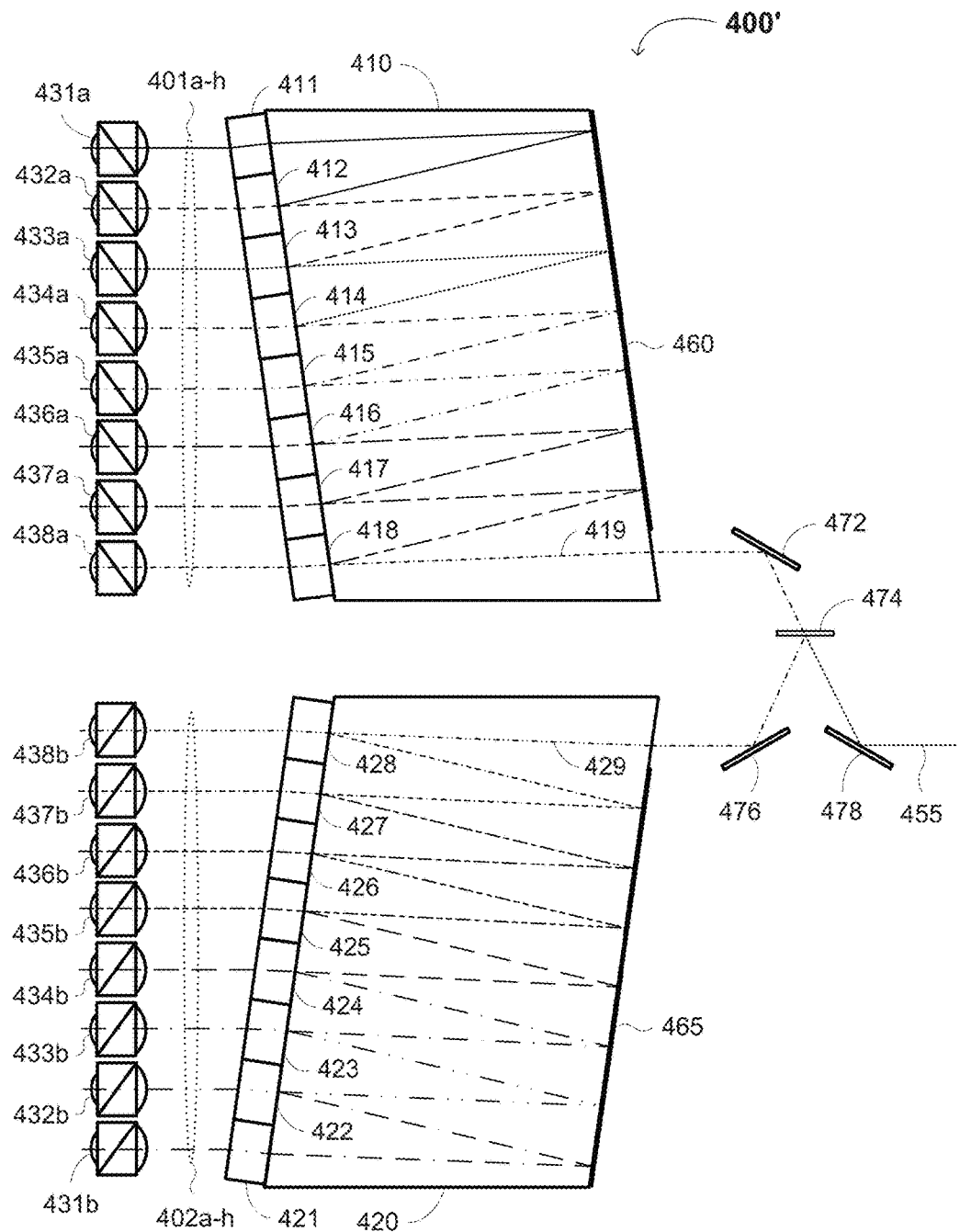

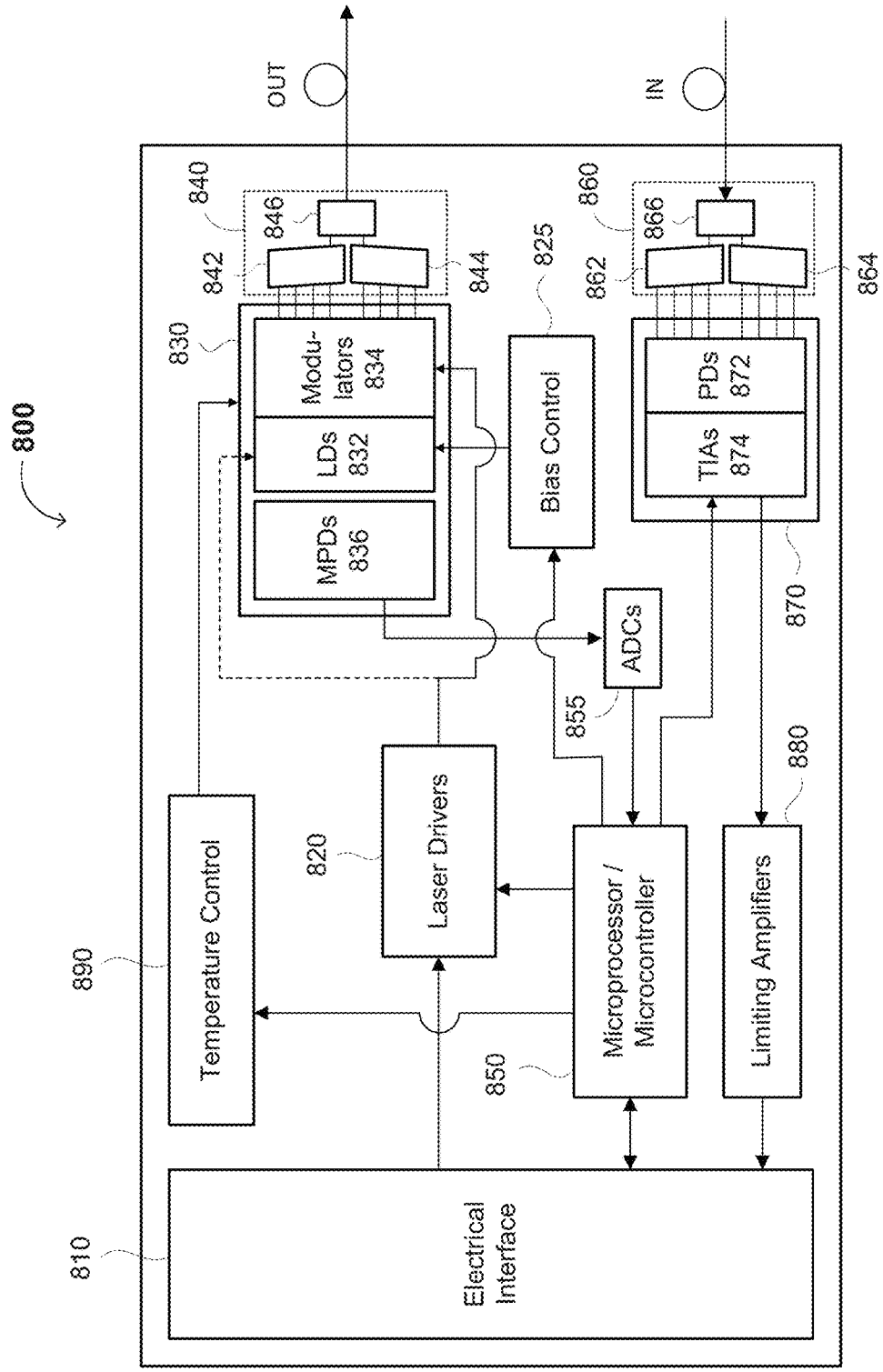

MULTI-CHANNEL OPTICAL MULTIPLEXERS AND DEMULTIPLEXERS, OPTICAL TRANSMITTER, RECEIVER AND TRANSCEIVER COMPRISING THE SAME, AND METHODS OF MAKING AND USING THE SAME

FIELD OF THE INVENTION

The present invention relates to the field of optical communication, especially to optical multiplexers and demultiplexers, an optical or optoelectronic transmitter, receiver and/or transceiver including the same, and methods of making and using the same.

DISCUSSION OF THE BACKGROUND

In optical communications, optical signals carry information. For example, a transmitter (e.g., a laser or laser diode) in an optical or optoelectronic transceiver converts one or more electrical signals into optical signals, and a receiver (e.g., a photodiode) in an optical or optoelectronic transceiver converts one or more optical signals into electrical signals. One objective of optical communication research and development is to increase and/or maximize bandwidth (e.g., the amount of information transmitted) to the greatest extent possible.

At a given baud rate, the capacity of a transmitter or receiver in an optical transceiver is limited by the number of optical channels (or wavelengths for wavelength division multiplexing [WDM] systems) that one transmitter optical subassembly (TOSA) or receiver optical subassembly (ROSA) can contain. When conventional optical components are used to multiplex (mux) and/or demultiplex (demux) a multi-channel optical signal, a minimal size (e.g., compactness) and reliability are primary concerns about the system processing such signals.

FIG. 1A shows a multiplexer 10 for a conventional 4-channel transmitter, comprising first through fourth filters 32, 34, 36 and 38 at one end and a mirror 40 at an opposite end. The first filter 32 may be a high pass, low pass or bandpass filter. The second through fourth filters 34, 36 and 38 are wavelength-selective filters or beam combiners. Thus, in one embodiment, each of the first through fourth filters 32, 34, 36 and 38 is a bandpass filter. The first through fourth filters 32, 34, 36 and 38 and the mirror 40 may be oriented at an identical angle with respect to the optical signals 12, 14, 16 and 18 passing through respective first through fourth lenses 22, 24, 26 and 28.

The multiplexer 10 combines the first through fourth optical signals 12, 14, 16 and 18 to form a multi-channel signal 19. After passing through the first filter 32, the first optical signal 12 is reflected by a mirror 40 to a location or spot on the second filter 34 where it is combined with the second optical signal 14 to form a first combined signal 15. The first combined signal 15 is reflected by the mirror 40 to a location or spot on the third filter 36 where it is combined with the third optical signal 16 to form a second combined signal 17. The second combined signal 17 is reflected by the mirror 40 to a location or spot on the fourth filter 38 where it is combined with the fourth optical signal 18 to form the multi-channel signal 19, which is output through an output port to a transmission medium (e.g., an optical fiber).

The zig-zag shape of the optical paths of the optical signals 12, 15, 17 and 19 combined with the filter array 32-38 is the simplest way to mux optical signals from lasers having different wavelengths into a single fiber, as shown in FIG. 1A. More bandwidth can be added to the transmitter by increasing the number of optical channels in the multiplexer. For example, the multiplexer 50 of FIG. 1B includes 8 channels 51-58 at 8 different wavelengths, respectively passing through eight lenses 61-68 and eight filters 71-78, the first seven of which are reflected by a mirror 80 to form an 8-channel optical signal 59.

However, when the number of wavelengths increases, the size of the system grows considerably, both in the transverse and longitudinal directions. If a single block 50 is used to mux all 8 channels 51-58, it may cause some issues. For example, the optical path difference becomes relatively large between the first channel 51 and the last channel 58, making the design and alignment of the lenses 61-68 more difficult. Any pitch error accumulates over the increased number of channels 51-58. For example, if the first channel 51 has a small error, it will be 8 times greater at the last channel 58. In other words, it becomes more difficult to ensure good performance for each channel.

Furthermore, since the structural block for the multiplexer 50 has an alignment axis in the plan view (FIG. 1B) that is not at a right angle, the length of the structural block also increases with increasing channel number, which is highly undesirable given the fixed dimensions of standard optical transceiver packages. The system is also more vulnerable to index variations due to changes of temperature and/or pressure.

There are a few methods to reduce the overall dimensions of the system, but each method has its drawbacks. For example, one may remove the structural block 50 that holds the filters 71-78 together (e.g., using air between the filters). This reduces both the length and the width of the system. However, without a solid piece to provide reference surfaces for the other optical components, it is generally very difficult to place the filters 71-78 in precise positions, as designed. Also, the stability of the system is adversely affected, since the contact area between the filters 71-78 and the optical bench (e.g., the substrate on which the optical components are placed) is much smaller than the contact area between the structural block 50 and the optical bench, as well as the contact area between the filters 71-78 and the structural block 50.

Another method to reduce the dimensions of the system is to use a low refractive index material for the structural block 50. The lowest refractive index of an available transparent material is about 1.3, which means the dimensions are not reduced by much (e.g., relative to glass or quartz). Meanwhile, using a special refractive index material increases the cost of the multiplexer.

Yet another method to reduce the dimensions of the system is to increase the angle of the structural block 50. This reduces the length of system, but does not reduce the width by much, since the angle between the outermost signal 51 and the corresponding wall of the structural block 50 also increases. Besides, coatings at a large angle relative to an incident beam are more sensitive to the angle of the incident beam, therefore causing potential tolerance issues.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide an optical multiplexer comprising a first structural block configured to combine a first plurality of individual optical signals into a first multi-channel optical signal, a second structural block configured to combine a second plurality of individual optical signals into a second multi-channel optical signal, and a beam combiner configured to combine the first and second multi-channel optical signals into a third multi-channel optical signal. Each of the first and second structural blocks comprises at least one mirror and at least one filter. The beam combiner also comprises one or more mirrors and one or more filters. The third multi-channel optical signal has the same number of channels as the sum of the first and second multi-channel optical signals. In some embodiments, each of the structural blocks in the optical multiplexer is configured to combine at least four individual optical signals into a corresponding multi-channel optical signal, in which case each structural block has at least three filters. In further or alternative embodiments, each of the individual optical signals has a wavelength that differs from a wavelength of any adjacent individual optical signals by at least 0.4 nm.

In various embodiments, the first structural block comprises a first parallelogram-shaped block, the second structural block comprises a second parallelogram-shaped block, and parallel sides of the first parallelogram-shaped block are parallel to parallel sides of the second parallelogram-shaped block. In general, in each of the first and second structural blocks, the mirror is on a distal and/or angled side of the parallelogram-shaped block, and the plurality of filters are on a near or opposite angled side of the parallelogram-shaped block.

In further embodiments, the optical multiplexer further comprises a plurality of lenses through which the individual optical signals pass before entering the first and second structural blocks. The optical multiplexer may also further comprise a third structural block, and optionally, a fourth structural block. The third and fourth structural blocks may also comprise at least one mirror and at least one filter, and/or be configured to combine respective third and fourth pluralities of individual optical signals into a corresponding multi-channel optical signal. In such embodiments, the filter(s) in the beam combiner may comprise (i) a first wavelength-selective and/or polarization-dependent filter configured to combine the first and second multi-channel optical signals into the third multi-channel optical signal and (i) a second wavelength-selective and/or polarization-dependent filter configured to combine the third multi-channel optical signal and a fourth multi-channel optical signal (from the third and optional fourth structural block) into a fifth multi-channel optical signal. The fifth multi-channel optical signal has the same number of channels as the sum of the third and fourth multi-channel optical signals.

In the present optical multiplexer, the filters may each comprise a wavelength-selective (e.g., highpass, lowpass, or bandpass) and/or polarization-dependent filter. For example, the beam combiner may include a wavelength-selective and/or polarization-dependent filter configured to reflect the first multi-channel optical signal and allow the second multi-channel optical signal to pass through. The mirrors generally comprise a non-selective (or total reflectance) mirror configured to reflect the optical signal impinging thereon. For example, the beam combiner may include a non-selective mirror configured to reflect the first multi-channel optical signal towards the wavelength-selective and/or polarization-dependent filter. In some embodiments, the beam combiner comprises a parallelogram-shaped block, the non-selective mirror is on a first surface of the parallelogram-shaped block, and the wavelength-selective and/or polarization-dependent filter is on a parallel surface of the parallelogram-shaped block. In such a beam combiner, another non-selective mirror configured to reflect the third multi-channel optical signal towards a further target (such as an optical fiber or a further beam combiner) may be present.

In some embodiments, the first multi-channel optical signal has a first polarization type, the second multi-channel optical signal has a second polarization type that is identical to or different from the first polarization type, and the optical multiplexer further comprises a first waveplate configured to change a polarization angle of the first multi-channel optical signal. In such embodiments, the optical multiplexer may further comprise a second waveplate configured to change a polarization angle of the second multi-channel optical signal. In either case, the filter(s) in the beam combiner may comprise a polarization-dependent filter.

In general, the optical signals may be polarized or unpolarized. The structural block may have a first face at a fixed angle relative to the incoming single-channel optical signals or the multi-channel optical signal, and one or more second faces parallel or substantially parallel to the incoming single-channel optical signals or the multi-channel optical signal. For example, the first face of the structural block may be at an angle relative to the incoming optical signal(s) of from 60° to 85°.

A further aspect of the present invention relates to an optical module, comprising the present multiplexer, a plurality of optical or optoelectronic transmitters, a fiber adapter or connector configured to receive an optical fiber, and a package or housing including the optical multiplexer and the plurality of optical or optoelectronic transmitters. The optical fiber carries the multi-channel optical output signal from the present multiplexer.

In certain embodiments, the optical module further comprises a plurality of an optical or optoelectronic receivers, and an optical demultiplexer configured to separate an incoming multi-channel optical signal into a plurality of individual incoming optical signals. The optical or optoelectronic receivers may be configured to convert a unique one of the plurality of individual incoming optical signals into an electronic signal.

In certain embodiments, the optical module further comprises a plurality of lenses, each inside the package or housing. In general, the lenses focus and/or collimate a corresponding individual optical signal.

Another aspect of the present invention relates to an optical demultiplexer, comprising a beam splitter comprising one or more mirrors and one or more filters, and first and second structural blocks similar to those in the present optical multiplexer. The beam splitter is configured to separate a first multi-channel optical signal into second and third multi-channel optical signals. Thus, the first multi-channel optical signal has the same number of channels as the sum of the second and third multi-channel optical signals. The first structural block comprises at least one mirror and at least one filter, and is configured to separate the second multi-channel optical signal into a first plurality of individual optical signals. The second structural block also comprises at least one mirror and at least one filter, and is configured to separate the third plurality of optical signals into a second plurality of individual optical signals.

Another aspect of the present invention relates to a method of forming a multi-channel optical output signal, comprising combining a first plurality of individual optical signals into a first multi-channel optical signal using a first structural block comprising at least one first mirror and at least one first filter, combining a second plurality of individual optical signals into a second multi-channel optical signal using a second structural block comprising at least one second mirror and at least one second filter, and combining the first and second multi-channel optical signals into a third multi-channel optical signal using a beam combiner comprising one or more third mirrors and one or more third filters. The third multi-channel optical signal is at least a component of the multi-channel optical output signal.

In general, combining the first plurality of individual optical signals comprises passing each of the first plurality of individual optical signals through a corresponding first filter and reflecting all but one of the first plurality of individual optical signals towards an adjacent first filter using the at least one first mirror, and combining the second plurality of individual optical signals comprises passing each of the second plurality of individual optical signals through a corresponding second filter and reflecting all but one of the second plurality of individual optical signals towards an adjacent second filter using the at least one second mirror.

As for the multiplexer, in some embodiments of the method, the beam combiner comprises a parallelogram-shaped block, the mirror(s) comprise a non-selective mirror on a first surface of the parallelogram-shaped block, and the filter(s) comprise a wavelength-dependent and/or polarization-dependent filter on a second surface of the parallelogram-shaped block parallel to the first surface of the parallelogram-shaped block. Additionally, or alternatively, the method may further comprise passing each of the individual optical signals through a corresponding lens before the individual optical signals enter the first and second structural blocks.

Another aspect of the present invention relates to a method of separating an incoming multi-channel optical signal into its individual optical signals, comprising separating the incoming multi-channel optical signal into first and second multi-channel optical signals using a beam splitter comprising one or more mirrors and one or more filters, separating the first multi-channel optical signal into a first plurality of individual optical signals using a first structural block comprising at least one mirror and at least one filter, and separating the second multi-channel optical signal into a second plurality of individual optical signals using a second structural block comprising at least one mirror and at least one filter. The number of individual optical signals in the first and second pluralities of individual optical signals is the same as the number of channels in the incoming multi-channel optical signal.

Yet another aspect of the present invention relates to a method of making an optical multiplexer or an optical demultiplexer, comprising placing a first structural block and a second structural block in locations such that respective first and second multi-channel optical signals (i) from the first and second structural blocks can be combined with a beam combiner or (ii) received from a beam splitter can be separated into respective first and second pluralities of individual optical signals, placing the beam combiner, beam splitter or components thereof in locations that (i) combine the first and second multi-channel optical signals into a third multi-channel optical signal or (i) separate the third multi-channel optical signal into the first and second multi-channel optical signals, and securing the first structural block, the second structural block and the beam combiner, beam splitter or components thereof when the first structural block, the second structural block and the beam combiner, beam splitter or components thereof are placed in the respective locations (i.e., the locations in which the optical multiplexer combines the first and second multi-channel optical signals into the third multi-channel optical signal, or the optical demultiplexer separates the third multi-channel optical signal into the first and second pluralities of individual optical signals). The first structural block comprises at least one first mirror and at least one first filter, the second structural block comprises at least one second mirror and at least one second filter, and the beam combiner, beam splitter or components thereof comprise(s) one or more third mirrors and one or more third filters. The third multi-channel optical signal has the same number of channels as the sum of the first and second multi-channel optical signals.

The present optical multiplexer and demultiplexer reduce accumulation of the geometric error (e.g., in optical signal alignment) over the channels in the multi-channel optical signal output from the multiplexer or input into the demultiplexer relative to the prior art. In addition, each structural block in the present optical multiplexer and demultiplexer is adjustable independently. Furthermore, the overall length of the multiplexer and demultiplexer is about the same as the corresponding design having half or fewer of the channels. Furthermore, the difference in minimum and maximum optical paths (e.g., the skew between the shortest and longest optical signal paths) is the same as the corresponding design having half or fewer of the channels. These and other advantages of the present invention will become readily apparent from the detailed description of various embodiments below.

BRIEF DESCRIPTION OF THE DRAWINGS

FIGS. 5A-B are diagrams showing other exemplary 16-channel multiplexers in accordance with embodiments of the present invention.

FIG. 9 is a diagram showing components in an exemplary optoelectronic transceiver and/or module in accordance with embodiments of the present invention.

DETAILED DESCRIPTION

Figure 1A:
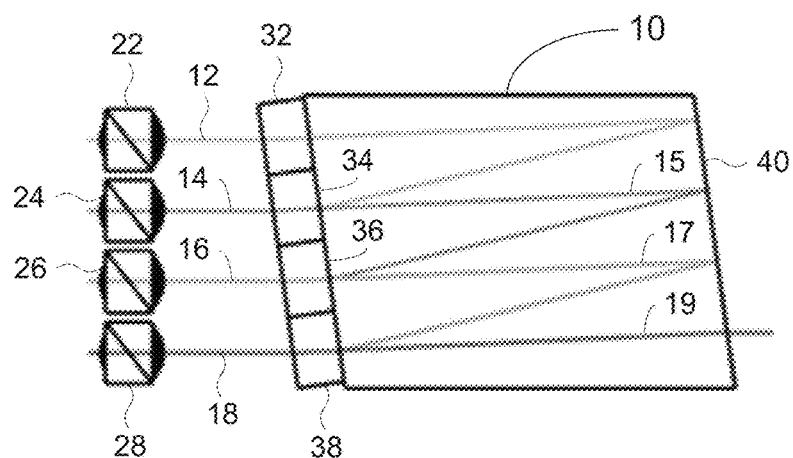
FIG. 1A is a diagram showing a conventional 4-channel multiplexer.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

Some portions of the detailed descriptions which follow are presented in terms of processes, procedures, logic, functions and other symbolic representations of operations on signals, code, data bits or data streams within a computer, transceiver, processor, controller and/or memory. These descriptions and representations are generally used by those skilled in the data processing arts to effectively convey the substance of their work to others skilled in the art. A process, procedure, logic operation, function, process, etc., is herein, and is generally, considered to be a step or a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and/or otherwise manipulated in a computer, data processing system, optical component, or circuit. It has proven convenient at times, principally for reasons of common usage, to refer to these signals as bits, streams, values, elements, symbols, characters, terms, numbers, information or the like. It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring data or information from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

An Exemplary Optical Multiplexer

Figure 2:
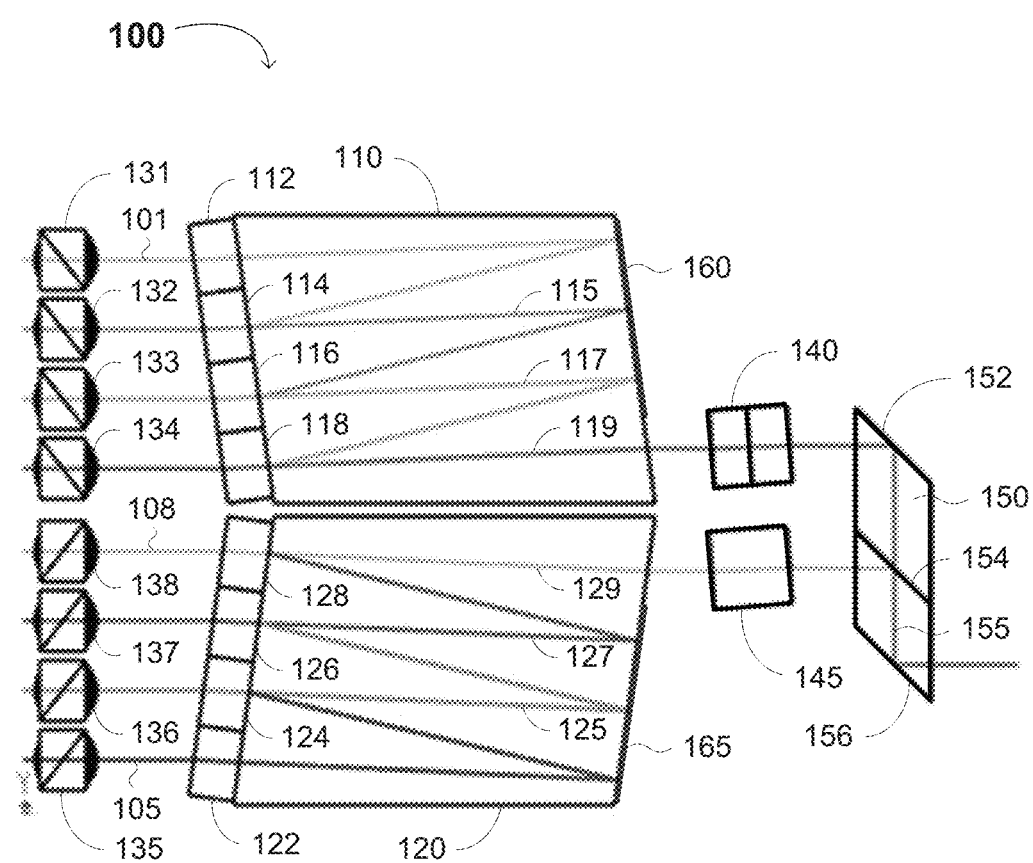
FIG. 2 is a diagram showing an exemplary 8-channel multiplexer in accordance with one or more embodiments of the present invention.

FIG. 2 shows an exemplary multiplexer 100 that includes a first structural block 110, a second structural block 120, a plurality of lenses 131-138, a first waveplate 140, a second waveplate 145, and a polarization beam combiner 150. The first structural block 110 includes a first plurality of filters 112, 114, 116 and 118 and a first mirror 160. The second structural block 120 includes a second plurality of filters 122, 124, 126 and 128 and a second mirror 165. The filters 112, 114, 116, 118, 122, 124, 126 and 128 may be wavelength-selective filters and/or polarization filters, and may comprise a separate component adhered or fixed onto the surface of the first or second structural block 110 or 120, or may be a coating applied to the surface of the first or second structural block 110 or 120. Thus, the first and second structural blocks 110 and 120 may comprise structures having mounting surfaces on which the filters 112, 114, 116, 118, 122, 124, 126 and 128 and the mirrors 160 and 165 may be mounted or secured (e.g., with adhesive, or a solid, transparent block of material on which layers of material forming the filters 112, 114, 116, 118, 122, 124, 126 and 128 and the mirrors 160 and 165 may be deposited (e.g., by physical deposition [evaporation, sputtering, etc.], chemical deposition [chemical vapor deposition, atomic layer deposition, etc.], printing, coating, etc.). The first and second mirrors 160 and 165 are non-selective or total reflectance mirrors. The first and second structural blocks 110 and 120 and the polarization beam combiner 150 are capable of reducing both the length and the width dimensions of the multiplexer 100, without affecting the reliability of the optical transmitter including the multiplexer 100.

First through eighth optical signals 101-108 from respective first through eighth optical transmitters (e.g., laser diodes; not shown) pass through a corresponding one of the plurality of lenses 131-138 and a corresponding one of the filters 112, 114, 116, 118, 122, 124, 126 and 128. The filters 112 and 122 are optional, and can be or comprise a high bandpass filter, a low bandpass filter, and/or a polarization filter. The first through eighth optical signals 101-108 have different wavelengths, and in some instances, different polarization types. For example, the first through fourth optical signals 101-104 may have a first polarization type (e.g., s-polarization), and the fifth through eighth optical signals 105-108 may have a second polarization type (e.g., p-polarization).

In the first structural block 110, the first optical signal 101 is reflected by the mirror 160 to the spot or location on the second filter 114 where the second optical signal 102 passes. The first optical signal 101 is reflected by the second filter 114 at an angle such that the two optical signals 101 and 102 have the same optical path, thereby forming a combined signal 115. The combined signal 115 is reflected by the mirror 160 to the spot or location on the third filter 116 where the third optical signal 103 passes. The combined signal 115 is reflected by the third filter 116 at an angle such that the three optical signals (i.e., the two optical signals in the combined signal 115 and the third optical signal 103) have the same optical path, thereby forming a combined signal 117. The combined signal 117 is reflected by the mirror 160 to the spot or location on the fourth filter 118 where the fourth optical signal 104 passes. The combined signal 117 is reflected by the fourth filter 118 at an angle such that the four optical signals (i.e., the three optical signals in the combined signal 117 and the fourth optical signal 104) have the same optical path, thereby forming a 4-channel optical signal 119. The mirror 160 covers at least the areas or locations where the optical signals 101, 115 and 117 impinge, but does not cover the area or location where the optical signal 119 impinges.

The same process occurs in the second structural block 120 to form a second 4-channel optical signal 129. The fifth optical signal 105 is reflected by the mirror 165 to the spot or location on the sixth filter 124 where the sixth optical signal 106 passes, where the fifth optical signal 105 is reflected and the two optical signals 105 and 106 form a combined signal 125. The combined signal 125 is reflected by the mirror 165 to the spot or location on the seventh filter 116 where the seventh optical signal 107 passes, where the combined signal 125 is reflected such that the three optical signals have the same optical path and form a combined signal 127. The combined signal 127 is reflected by the mirror 165 to the spot or location on the eighth filter 128 where the eighth optical signal 108 passes, where the combined signal 127 is reflected such that the four optical signals have the same optical path and form the second 4-channel optical signal 129. The mirror 165 covers at least the areas or locations where the optical signals 105, 125 and 127 impinge, but does not cover the area or location where the optical signal 129 impinges.

In the example multiplexer 100 of FIG. 2, the 4-channel optical signals 119 and 129 have the same polarization type (e.g., s-polarization or p-polarization). When the 4-channel optical signals 119 and 129 have the same polarization type, the first 4-channel optical signal 119 passes through a first waveplate 140, and the second 4-channel optical signal 129 passes through a second waveplate 145. In one example, the first waveplate 140 changes or shifts the phase of the first 4-channel optical signal 119 in a positive direction, and the second waveplate 145 changes or shifts the phase of the second 4-channel optical signal 129 in a negative direction. For instance, the first waveplate 140 may change or shift the phase of the first 4-channel optical signal 119 by +45°, and the second waveplate 145 may change or shift the phase of the second 4-channel optical signal 129 by −45°, although the invention is not limited to this example. In such an example, each of the first and second waveplates 140 and 145 comprises a quarter waveplate. In an alternative example, one of the first and second waveplates 140 and 145 is omitted, in which case the remaining one of the first and second waveplates 140 and 145 comprises a half waveplate that may change or shift the phase of the corresponding 4-channel optical signal by ±90°. In any case, the first and/or second waveplates 140 and 145 may further include an optical isolator. More generally, the first and/or second waveplates 140 and 145 may be any that result in a difference in the phases of the 4-channel optical signals 119 and 129 of $(2n+1)*90°$ (where n is an integer), although other alternatives are envisioned that are not limited to this specific relationship. This results in the 4-channel optical signals 119 and 129 having different polarization types or states as they enter the polarization beam combiner (PBC) 150.

Alternatively, the 4-channel optical signal 119 may have a first polarization type (e.g., one of s-polarization and p-polarization), and the 4-channel optical signal 129 may have a second polarization type (e.g., the other one of s-polarization and p-polarization). In such a case, the first and second waveplates 140 and 145 may be omitted, as the first and second 4-channel optical signals 119 and 129 have a sufficient (e.g., 90°) phase difference between them.

After passing through the first waveplate 140, the first 4-channel optical signal 119 is reflected by the mirror 152 in the PBC 150. The mirror 152 is generally a non-selective mirror (i.e., it reflects substantially all wavelengths of light that may be in the first 4-channel optical signal 119). The first 4-channel optical signal 119 then passes through the filter 154 in the PBC 150. After passing through the second waveplate 145, the second 4-channel optical signal 129 is aligned with the spot or location where the first 4-channel optical signal 119 passes through the filter 154 and is reflected by the filter 154, thereby combining the first and second 4-channel optical signals 119 and 129 to form 8-channel optical signal 155. The filter 154 may be a polarization-based filter (e.g., one that reflects light having a first polarization type and that allows light having a second, different polarization type to pass through) and/or a wavelength-selective filter (e.g., one that reflects light above a threshold wavelength and that allows light having wavelength below the threshold wavelength to pass through, or vice versa).

The 8-channel optical signal 155 is then reflected by a second mirror 156 in the PBC 150. The second mirror 156 is also non-selective with respect to the wavelengths of light in the 8-channel optical signal 155. The second mirror 156 is optional, and can be omitted in embodiments in which the multiplexer 100 can be oriented orthogonally to the 8-channel optical signal 155 from the filter 154, or when the axis of the optical signal 129 is in a location and/or position relative to the outside dimensions of the multiplexer 100 such that the location and/or position of the optical signal 129 does not need to be shifted laterally (in which case the filter 154 reflects the first 4-channel optical signal 119 and is transparent to the second 4-channel optical signal 129).

Figure 1B:
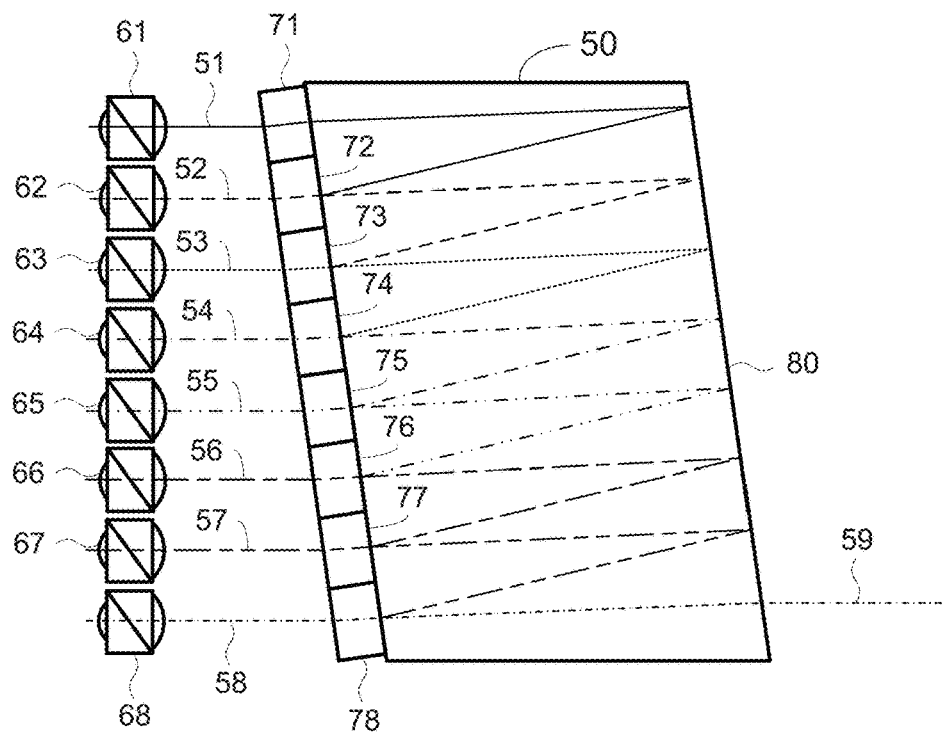
FIG. 1B is a diagram showing an 8-channel multiplexer according to the design of FIG. 1A.

As shown in FIG. 2, by using two structural blocks 110 and 120, the geometric error (e.g., in optical signal alignment) does not accumulate over all of the channels in the optical signal 155 output from the multiplexer 100. In addition, each structural block 110 and 120 is adjustable independently. The overall length of the multiplexer 100 is about the same as the corresponding 4- or 8-channel design (e.g., as shown in FIGS. 1A-B). Furthermore, the difference in minimum and maximum optical paths (e.g., the skew between the shortest and longest optical signal paths) is the same as the corresponding 4-channel design (e.g., FIG. 1A).

The multiplexer 100 may include additional components in various optical paths, such as one or more additional lenses and/or additional bandpass and/or polarization filters. The additional lens(es) may be, for example, in the optical path of the 8-channel optical signal 155 after the PBC 150, or between either or both of the first and second waveplates 140 and 145 and the PBC 150. Furthermore, depending on the space in the housing of an optical transmitter including the multiplexer 100, the optical transmitter and/or multiplexer may include one or more simple (e.g., non-selective) mirrors in the optical path between the laser diode(s) (not shown) and the lenses 131-138.

Figure 3A:
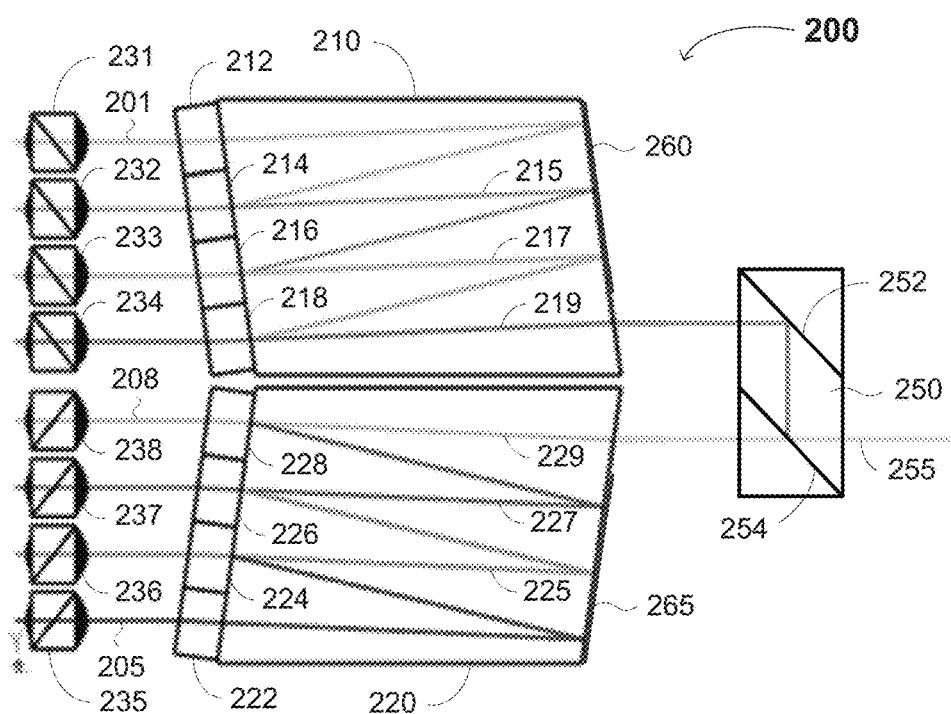
FIGS. 3A-B are diagrams showing other exemplary 8-channel multiplexers in accordance with embodiments of the present invention.

FIG. 3A shows an exemplary multiplexer 200 according to embodiments of the present invention, including a first structural block 210, a second structural block 220, a plurality of lenses 231-238, and a beam combiner 250. The first structural block 210 includes a first plurality of filters 212, 214, 216 and 218 and a first mirror 260. The second structural block 220 includes a second plurality of filters 222, 224, 226 and 228 and a second mirror 265. The filters 212, 214, 216, 218, 222, 224, 226 and 228 in the multiplexer 200 are generally wavelength-selective filters (although filters 212 and 222 are optional) and may comprise a separate component adhered or fixed onto the surface of the first or second structural block 210 or 220, or a coating applied to the surface of the first or second structural block 210 or 220. The filters 212, 214, 216, 218, 222, 224, 226 and 228 may also include a polarization filter (e.g., if the optical signals 201-208 are or are to be polarized). The first and second mirrors 260 and 265 are non-selective or total reflectance mirrors, and cover at least the areas or locations where the optical signals 201, 215 and 217 and 205, 225 and 227 respectively impinge, but do not cover the area or location where the optical signal 219 or 229 respectively impinge. The beam combiner 250 may comprise a rectangular structural block or support on which a mirror 252 and a filter 254 may be mounted or secured. Each of the mirror 252 and the filter 254 may be or comprise a coating on the surface of a transparent triangular block of material or on the surface of a plate or other substrate that is then mounted onto a triangular structural block. The first and second structural blocks 210 and 220 and the beam combiner 250 are capable of reducing both the length and the width dimensions of the multiplexer 200, without affecting the reliability of the optical transmitter including the multiplexer 200.

The lenses 231-238 and first and second structural blocks 210 and 220 function in substantially the same manner as lenses 131-138 and first and second structural blocks 110 and 120 in FIG. 2. First through eighth optical signals 201-208 from respective first through eighth optical transmitters pass through a corresponding one of the plurality of lenses 231-238 and a corresponding one of the filters 212, 214, 216, 218, 222, 224, 226 and 228. The first through eighth optical signals 201-208 have different wavelengths. There is a spacing between adjacent wavelengths of the signals 201-208 of at least 0.4 nm (e.g., 0.4 nm, 0.8 nm 2.0 nm, etc.). In some instances, the optical signals 201-208 may have a polarization type that is the same as or different from one or more of the other optical signals 201-208.

In the structural blocks 210 and 220, the first and fifth optical signals 201 and 205 are respectively reflected by the mirrors 260 and 265 to the spot or location on the second and sixth filters 214 and 224 where the second and sixth optical signals 202 and 206 respectively pass. The first and fifth optical signals 201 and 205 are reflected by the second and sixth filters 214 and 224 to form combined signals 215 and 225. The combined signals 215 and 225 are respectively reflected by the mirrors 260 and 265 to the spot or location on the third and seventh filters 216 and 226 where the third and seventh optical signals 203 and 207 pass. The combined signals 215 and 225 are reflected by the third and seventh filters 216 and 226 to form combined signals 217 and 227, respectively. The combined signals 217 and 227 are reflected by the mirrors 260 and 265 to the spot or location on the fourth and eighth filters 218 and 228 where the fourth and eighth optical signals 204 and 208 pass. The combined signals 217 and 227 are reflected by the fourth and eighth filters 218 and 228 to form 4-channel optical signals 219 and 229, respectively.

The 4-channel optical signal 219 is reflected by the mirror 252 in the beam combiner 250. The mirror 252 is generally a non-selective mirror (i.e., it reflects substantially all wavelengths of light that may be in the first 4-channel optical signal 219). The 4-channel optical signal 219 is then reflected by the filter 254 at the spot or location where the 4-channel optical signal 229 passes through the filter 254, thereby combining the 4-channel optical signals 219 and 229 to form 8-channel optical signal 255. The filter 254 may be a highpass or lowpass filter (e.g., one that reflects light above a threshold wavelength and that allows light having wavelength below the threshold wavelength to pass through, or vice versa). Alternatively, the filter 254 may be a bandpass filter (e.g., one that reflects light below a first threshold wavelength and above a second threshold wavelength higher than the first threshold wavelength, but that allows light having a wavelength between the first and second threshold wavelengths to pass through).

The multiplexer 200 in FIG. 3A has substantially the same advantages as the multiplexer 100 in FIG. 2 (e.g., the geometric error or signal spreading does not accumulate over all of the channels in the optical signal 255 output from the multiplexer 200, each structural block 210 and 220 is adjustable independently, the overall length is about the same as the corresponding 4- or 8-channel design, the difference in minimum and maximum optical path lengths is the same as the corresponding 4-channel design, etc.). In addition, the multiplexer 200 may include additional components in various optical paths, such as one or more additional lenses, bandpass and/or polarization filters, and/or mirrors.

Figure 3B:
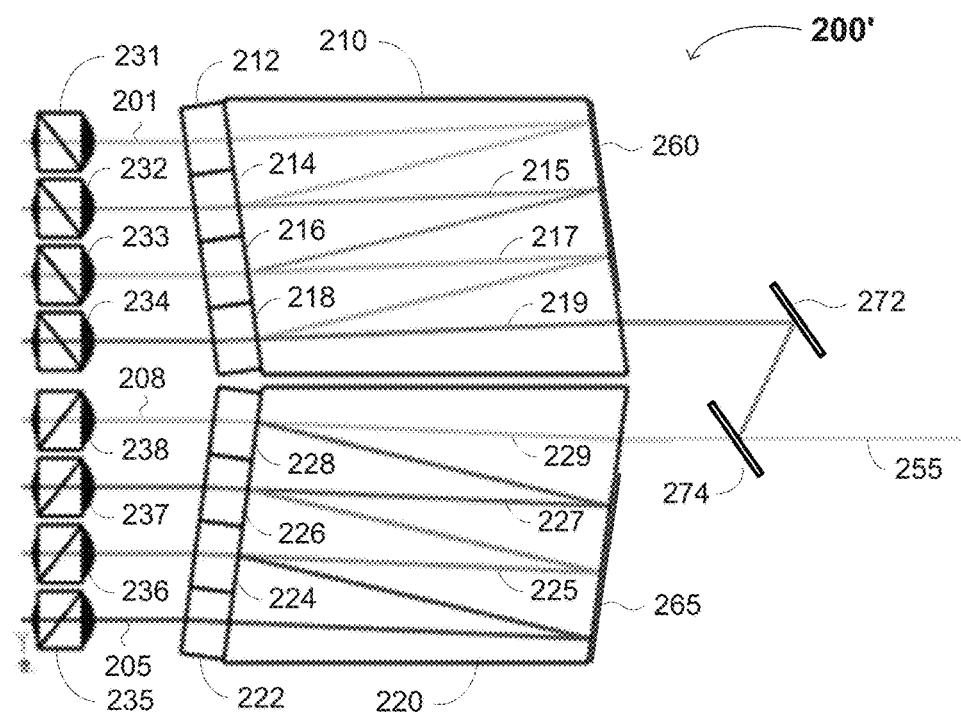

FIG. 3B shows an alternative multiplexer 200' that is substantially similar to the multiplexer 200 of FIG. 3A, except that the beam combiner 250 is replaced by a single non-selective mirror 272 and a separate filter 274. The mirror 272 may be structurally similar and/or functionally identical to the mirror 252 in FIG. 3A, and the filter 274 may be structurally similar and/or functionally identical to the filter 254 (e.g., it may be or comprise a highpass, lowpass or bandpass filter). The multiplexer 200' of FIG. 3B may be less expensive and have greater flexibility than the multiplexer 200 of FIG. 3A (e.g., the mirror 272 and the filter 274 can be placed in a variety of different locations to allow a variety of different placements and/or orientations of the first and second structural blocks 210 and 220 relative to each other), but it may also be more likely to have a tracking error (e.g., due to potential misalignment of the mirror 272 and separate filter 274).

Figure 4:
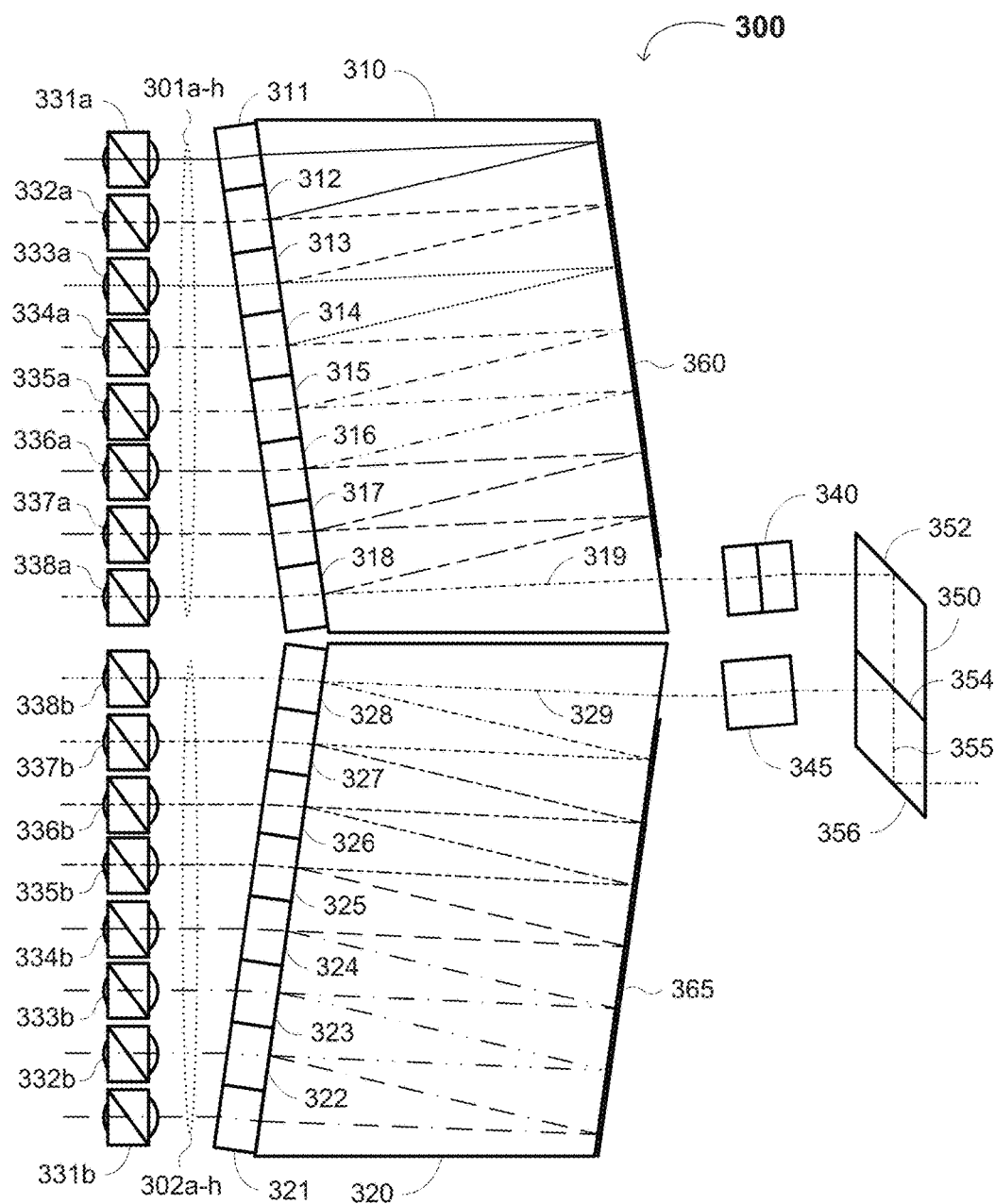
FIG. 4 is a diagram showing an exemplary 16-channel multiplexer in accordance with one or more embodiments of the present invention.

The present multiplexer design can be extended to higher-bandwidth applications in which the error or skew across 8 multiplexed signals is acceptable, but the error or skew across a larger number of multiplexed signals is unacceptable. FIG. 4 shows an exemplary multiplexer 300 according to embodiments of the present invention, including a first structural block 310, a second structural block 320, a first plurality of lenses 331a-338a, a second plurality of lenses 331b-338b, a first waveplate 340, a second waveplate 345, and a polarization beam combiner (PBC) 350. The first structural block 310 includes a first plurality of filters 311-318 and a first mirror 360. The second structural block 320 includes a second plurality of filters 321-328 and a second mirror 365. The filters 311-318 and 321-328 may be wavelength-selective filters and/or polarization filters (although filters 311 and 321 are optional), and may comprise a separate component adhered or fixed onto the surface of the first or second structural block 310 or 320, or may be a coating applied to the surface of the first or second structural block 310 or 320. The first and second mirrors 360 and 365 are non-selective or total reflectance mirrors. The mirrors 360 and 365 cover at least the areas or locations where the optical signals reflected by and passing through the filters 311-318 and 321-328 impinge on the distal surface of the first and second structural blocks 310 and 320, respectively, but do not cover the area or location where the optical signals 319 and 329 impinge.

The lenses 331a-338a and 331b-338b, filters 311-318 and 321-328, and the mirrors 360 and 365 function in substantially the same way as the lenses, filters and mirrors in FIGS. 2-3, except that the number of optical signals multiplexed by each structural block 310 and 320 is greater. The optical signals multiplexed in each structural block 310 and 320 have different wavelengths and may have the same or different polarization types. In one example, each of the optical signals has the same polarization type (e.g., s-polarization or p-polarization).

Similar to the example multiplexer 200 of FIG. 2, the first 8-channel optical signal 319 passes through a first waveplate 340, and the second 8-channel optical signal 329 passes through a second waveplate 345. In one example, the first waveplate 340 changes or shifts the phase of the first 8-channel optical signal 319 by +45°, and the second waveplate 345 changes or shifts the phase of the second 8-channel optical signal 329 by −45°, although the invention is not limited such an example. However, in such an example, each of the first and second waveplates 340 and 345 comprises a quarter waveplate. The alternative examples of FIG. 2 can also be applied to the example multiplexer 300 of FIG. 4.

After passing through the first waveplate 340, the first 8-channel optical signal 319 is reflected by the mirror 352 in the PBC 350. The mirror 352 is generally non-selective. The first 8-channel optical signal 319 then passes through the filter 354 in the PBC 350. The filter 354 may be polarization-dependent (i.e., it reflects light having a first polarization type and allows light having a second, different polarization type to pass through) and/or comprise a highpass, lowpass, or bandpass filter. After passing through the second waveplate 345, the second 8-channel optical signal 329 impinges on the spot or location where the first 8-channel optical signal 319 passes through the filter 354 and is reflected by the filter 354, thereby combining the first and second 8-channel optical signals 319 and 329 to form 16-channel optical signal 355.

The 16-channel optical signal 355 is then reflected by a second mirror 356 in the PBC 350. The second mirror 356 is also non-selective. The second mirror 356 is optional, and can be omitted in embodiments in which the multiplexer 300 can be oriented orthogonally to the 16-channel optical signal 355 from the filter 354. The multiplexer 300 in FIG. 4 has substantially the same advantages as the multiplexers 100 and 200 in FIGS. 2-3 (e.g., the geometric error or signal spreading does not accumulate over all of the channels in the optical signal output from the multiplexer, each structural block is adjustable independently, the overall length is about the same as the corresponding 4-, 8- or 16-channel design, the difference in minimum and maximum optical path lengths is the same as the corresponding 8-channel design, etc.), and the multiplexer 300 may include additional components in various optical paths, such as one or more additional lenses, bandpass and/or polarization filters, and/or mirrors, similar to the multiplexers 100 and 200 in FIGS. 2-3.

Figure 5A:
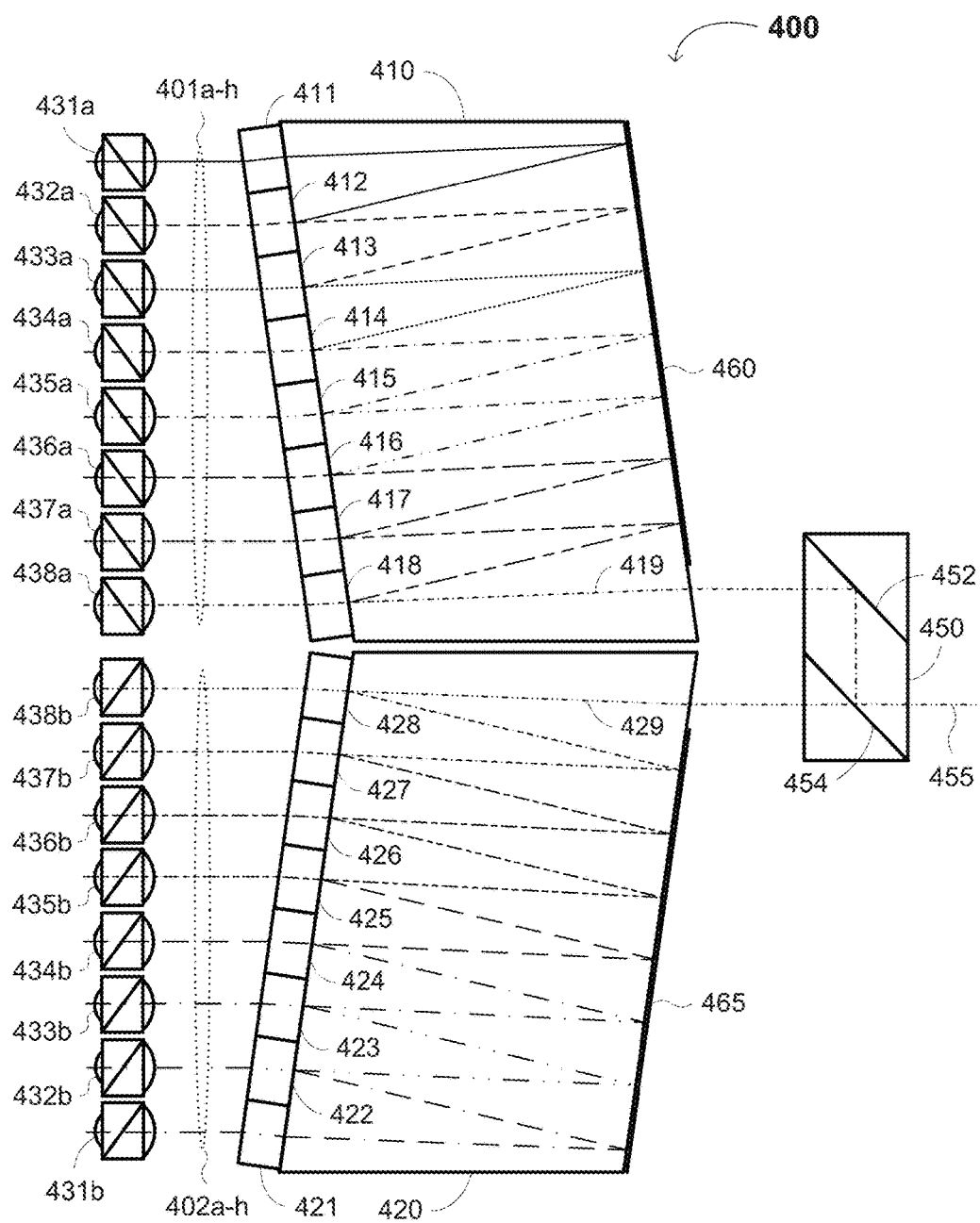

FIG. 5A shows a further embodiment of a 16-channel multiplexer 400, structurally and functionally similar to the multiplexer 200 of FIG. 3A. The multiplexer 400 includes a first structural block 410, a second structural block 420, a first plurality of lenses 431a-438a, a second plurality of lenses 431b-438b, and a beam combiner 450. The first structural block 410 includes a first plurality of filters 411-418 and a first mirror 460. The second structural block 420 includes a second plurality of filters 421-428 and a second mirror 465. The filters 411-418 and 421-428 are generally wavelength-selective filters (filters 411 and 421 are optional), but may further comprise a polarization filter. The filters 411-418 and 421-428 may comprise a separate component adhered or fixed onto the surface of the first or second structural block 410 or 420, or may be or comprise one or more coatings applied to the surface of the first or second structural block 410 or 420. The first and second mirrors 460 and 465 are non-selective or total reflectance mirrors. The mirrors 460 and 465 cover at least the areas or locations where the optical signals reflected by and passing through the filters 411-418 and 421-428 impinge on the distal surface of the first and second structural blocks 410 and 420, respectively, but do not cover the area or location where the optical signals 419 and 429 impinge. Like the beam combiner 250 of FIG. 3A, the beam combiner 450 may comprise a parallelogram-shaped structural block, comprising a mirror 452 and a filter 454 (each of which may be or comprise a coating on the surface of the structural block).

The lenses 431a-438a and 431b-438b, the filters 411-418 and 421-428, and the mirrors 460 and 465 function in substantially the same way as the lenses, filters and mirrors in FIG. 4. The optical signals multiplexed in each structural block 410 and 420 have different wavelengths and have qualities similar or identical to the optical signals in FIGS. 3A-B.

Similar to the example multiplexer 200 of FIG. 3A, the first 8-channel optical signal 419 is reflected by the mirror 452 in the beam combiner 450. The beam combiner 450 is generally similar to the beam combiner 250 in FIG. 3A. The mirror 452 is generally non-selective. The first 8-channel optical signal 419 impinges on the spot or location where the second 8-channel optical signal 429 passes through the filter 454. The first 8-channel optical signal 419 is reflected by the filter 454, thereby combining the first and second 8-channel optical signals 419 and 429 to form 16-channel optical signal 455. The filter 454 generally comprises a highpass, lowpass, or bandpass filter.

The multiplexer 400 may include additional components in various optical paths, such as one or more additional lenses, bandpass and/or polarization filters, and/or mirrors, similar to the multiplexers 100, 200, 200' and 300 in FIGS. 2-4. The multiplexer 400 in FIG. 5 has substantially the same advantages as the multiplexers 200 and 300 in FIGS.

3A and 4 (e.g., the geometric error or signal spreading does not accumulate over all of the channels in the optical signal output from the multiplexer, each structural block is adjustable independently, the overall length is about the same as the corresponding 4-, 8- or 16-channel design, the difference in minimum and maximum optical path lengths is the same as the corresponding 8-channel design, etc.).

FIG. 5B shows an alternative 16-channel multiplexer 400, structurally similar and functionally identical to the multiplexer 400 of FIG. 5A. The first structural block 410, second structural block 420, first plurality of lenses 431a-438a, second plurality of lenses 431b-438b and optical signals in the multiplexer 400' are identical or substantially identical to those in the multiplexer 400, although the spacing between the first and second structural blocks 410 and 420 may differ. The multiplexer 400' replaces the beam combiner 450 in the multiplexer 400 with first, second and third mirrors 472, 476 and 478 and a filter 474.

Similar to the example multiplexer 400 of FIG. 5A, the first 8-channel optical signal 419 is reflected by the first mirror 472, which is generally non-selective, and passes through the filter 474. The second 8-channel optical signal 429 is reflected by the second mirror 476, which is generally non-selective, towards the filter 474. The second 8-channel optical signal 429 impinges on the spot or location where the first 8-channel optical signal 419 passes through the filter 474 and is reflected by the filter 474, thereby combining the first and second 8-channel optical signals 419 and 429 to form 16-channel optical signal 455. The filter 474 generally comprises a highpass, lowpass, or bandpass filter.

The multiplexer 400 may include additional components in various optical paths, such as one or more additional lenses, bandpass and/or polarization filters, and/or mirrors, similar to the multiplexers 100, 200, 200', 300 and 400 in FIGS. 2-5A. The multiplexer 400' in FIG. 5B has substantially the same advantages as the multiplexers 300, 300' and 400 in FIGS. 3A-B and 4 (e.g., the geometric error or signal spreading does not accumulate over all of the channels in the optical signal output from the multiplexer, each structural block is adjustable independently, the overall length is about the same as the corresponding 4-, 8- or 16-channel design, the difference in minimum and maximum optical path lengths is the same as the corresponding 8-channel design, etc.). although the arrangement of the mirrors 472, 476 and 478 and the filter 474 can be modified so that the 16-channel optical signal 455 output by the multiplexer 400' can be substantially anywhere and in substantially any direction.

Figure 6:
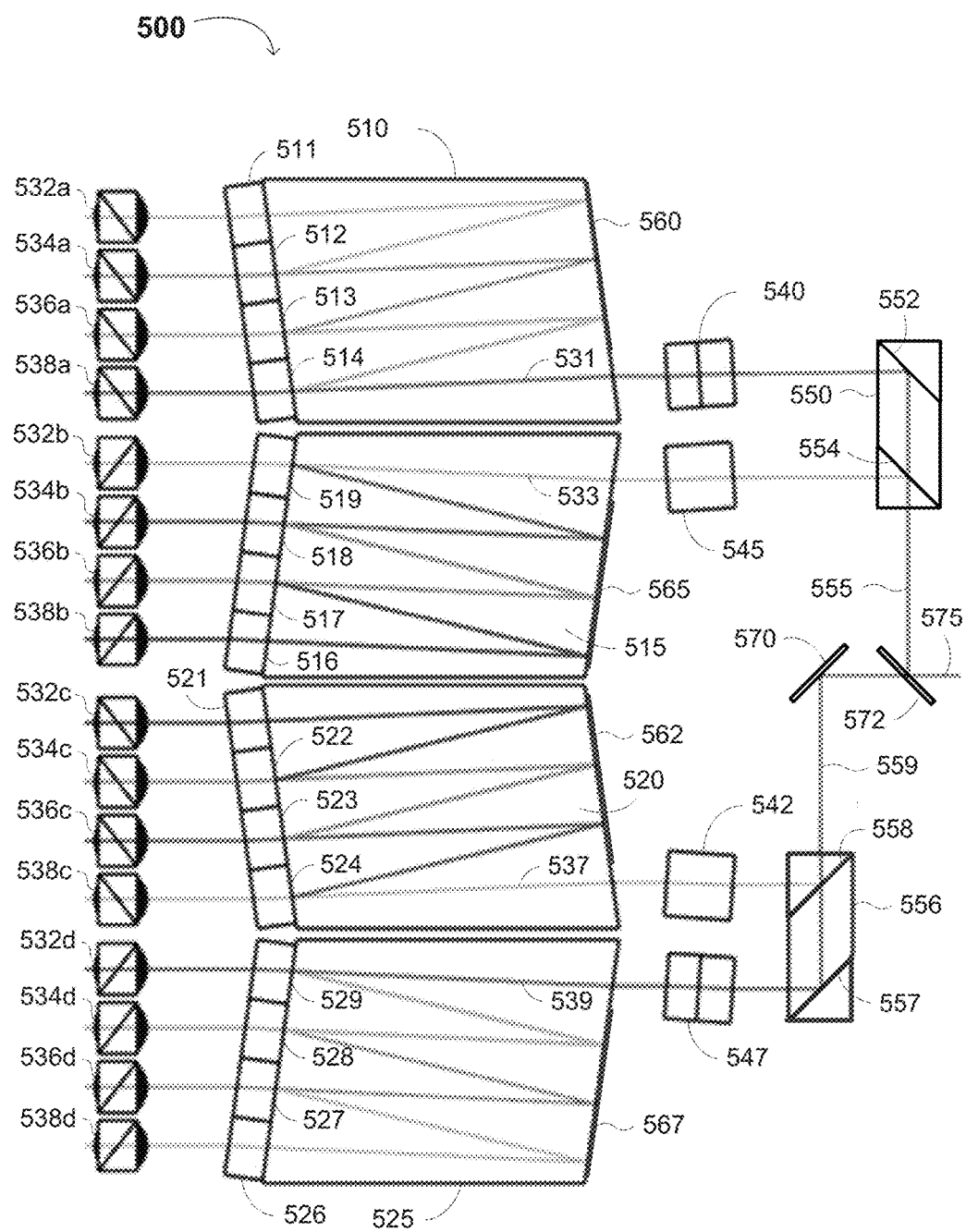
FIG. 6 is a diagram showing yet another exemplary 16-channel multiplexer in accordance with one or more embodiments of the present invention.

The present multiplexer design can be extended to higher-bandwidth applications (e.g., more than 8 channels) in which the error or skew across more than four multiplexed signals is unacceptable. FIG. 6 shows an exemplary multiplexer 500 according to embodiments of the present invention, including first through fourth structural blocks 510, 515, 520 and 525, first through fourth pluralities of lenses 532a-538d, first through fourth waveplates 540, 542, 544 and 546, polarization beam combiners (PBC) 550 and 555, and filter 570. The first structural block 510 includes a first plurality of filters 511, 512, 513 and 514 and a first mirror 560. The second structural block 520 includes a second plurality of filters 516, 517, 518 and 519 and a second mirror 565. The third structural block 515 includes a third plurality of filters 521, 522, 523 and 524 and a third mirror 562. The fourth structural block 520 includes a fourth plurality of filters 526, 527, 528 and 529 and a fourth mirror 567. The filters 511-514, 516-519, 521-524 and 526-529 may be wavelength-selective filters and/or polarization filters, and may comprise a separate component adhered or fixed onto the surface of the first, second, third or fourth structural block 510, 515, 520 or 525, or may be a coating applied to the surface of the first, second, third or fourth structural block 510, 515, 520 or 525, although filters 511, 516, 521 and 526 are optional. The first through fourth mirrors 560, 562, 565 and 567 are non-selective or total reflectance mirrors. The mirrors 560, 562, 565 and 567 cover at least the areas or locations where the optical signals reflected by and passing through the filters 511-514, 516-519, 521-524 and 526-528 impinge on the distal surface of the first through fourth structural blocks 510, 515, 520 and 525, respectively, but do not cover the area or location where the optical signals 531, 533, 537 and 539 output from the structural blocks 510, 515, 520 and 525 impinge.

Similar to the example multiplexers 100 and 300 of FIGS. 2 and 4, the 4-channel optical signals 531 and 539 pass through first and fourth waveplates 540 and 547, respectively, and the 4-channel optical signals 533 and 537 pass through second and third waveplates 545 and 542, respectively. In one example, the first and fourth waveplates 540 and 547 change or shift the phase of the first and fourth 4-channel optical signals 531 and 539 by +45°, and the second and third waveplates 545 and 542 change or shift the phase of the second and third 4-channel optical signals 533 and 537 by −45°, although the invention is not limited such an example. However, in such an example, each of the first through fourth waveplates 540, 542, 545 and 547 comprises a quarter waveplate.

After passing through the first and fourth waveplates 540 and 547, the first and fourth 4-channel optical signals 531 and 539 are respectively reflected by the mirrors 552 and 557 in the respective PBCs 550 and 556. The mirrors 552 and 557 are generally non-selective. The first and fourth 4-channel optical signals 531 and 539 then respectively pass through the filters 554 and 558 in the PBCs 550 and 556. The filters 554 and 558 may be polarization-dependent (i.e., they reflect light having a first polarization type and allow light having a second, different polarization type to pass through) and/or comprise a highpass, lowpass, or bandpass filter.

After passing through the second and third waveplates 545 and 542, the second and third 4-channel optical signals 533 and 537 impinge on the spots or locations where the first and fourth 4-channel optical signals 531 and 539 respectively pass through the filters 554 and 558. The first and fourth 4-channel optical signals 531 and 539 are respectively reflected by the filters 554 and 558, thereby combining the first and second 4-channel optical signals 531 and 533 and the third and fourth 4-channel optical signals 537 and 539 to respectively form 8-channel optical signals 555 and 559.

The 8-channel optical signal 559 is then reflected by a further mirror 570. The mirror 570 is generally non-selective. The 8-channel optical signal 559 passes through a further filter 572. The 8-channel optical signal 555 impinges on the filter 572 at the spot or location on the filter 572 where the 8-channel optical signal 559 passes through, and is reflected by the filter 572 to form a 16-channel output signal 575. The filter 572 may be polarization-dependent and/or comprise a highpass, lowpass, or bandpass filter.

In one example, the filter 572 is a highpass or lowpass filter, the optical signals in the first 4-channel optical signal 531 have a first polarization type and first through fourth wavelengths $\lambda_1$-$\lambda_4$, the optical signals in the second 4-channel optical signal 533 have a second polarization type and fifth through eighth wavelengths $\lambda_5$-$\lambda_8$, the optical signals in the third 4-channel optical signal 537 have the first polarization type and ninth through twelfth wavelengths $\lambda_9$-$\lambda_{12}$, and the optical signals in the fourth 4-channel optical signal 539 have the second polarization type and thirteenth through sixteenth wavelengths $\lambda_{13}$-$\lambda_{16}$. In such an embodiment, the differences between the wavelengths $\lambda_1$-$\lambda_8$ and the wavelengths $\lambda_9$-$\lambda_{16}$ may be greater than the differences between (i) the wavelengths $\lambda_1$-$\lambda_4$ and the wavelengths $\lambda_5$-$\lambda_8$ and (ii) the wavelengths $\lambda_9$-$\lambda_{12}$ and the wavelengths $\lambda_{13}$-$\lambda_{16}$. Alternatively, the filter 572 is a polarization-dependent filter, the optical signals in the first 4-channel optical signal 531 have a first polarization type and first through fourth wavelengths $\lambda_1$-$\lambda_4$, the optical signals in the second 4-channel optical signal 533 have the first polarization type and fifth through eighth wavelengths $\lambda_5$-$\lambda_8$, the optical signals in the third 4-channel optical signal 537 have a second polarization type and ninth through twelfth wavelengths $\lambda_9$-$\lambda_{12}$, and the optical signals in the fourth 4-channel optical signal 539 have the second polarization type and thirteenth through sixteenth wavelengths $\lambda_{13}$-$\lambda_{16}$, in which case the differences between the individual wavelengths $\lambda_1$-$\lambda_4$, the individual wavelengths $\lambda_5$-$\lambda_8$, the individual wavelengths $\lambda_9$-$\lambda_{16}$ and the individual wavelengths $\lambda_{13}$-$\lambda_{16}$ may be greater than the differences between the wavelengths $\lambda_1$-$\lambda_4$ and the wavelengths $\lambda_5$-$\lambda_8$, the wavelengths $\lambda_5$-$\lambda_8$ and the wavelengths $\lambda_9$-$\lambda_{12}$, and the wavelengths $\lambda_9$-$\lambda_{12}$ and the wavelengths $\lambda_{13}$-$\lambda_{16}$.

The multiplexer 500 in FIG. 6 has substantially the same advantages as the multiplexers 100, 200, 200', 300, 400 and 400' in FIGS. 2-5B (e.g., the geometric error or signal spreading does not accumulate over all of the channels in the optical signal output from the multiplexer, each structural block is adjustable independently, the overall length is about the same as the corresponding 4-, 8- or 16-channel design, the difference in minimum and maximum optical path lengths is the same as the corresponding 4-channel design, etc.), and the multiplexer 500 may include additional components in various optical paths, such as one or more additional lenses, bandpass and/or polarization filters, and/or mirrors, similar to the multiplexers 100, 200, 200', 300, 400 and 400' in FIGS. 2-5B.

Figure 7:
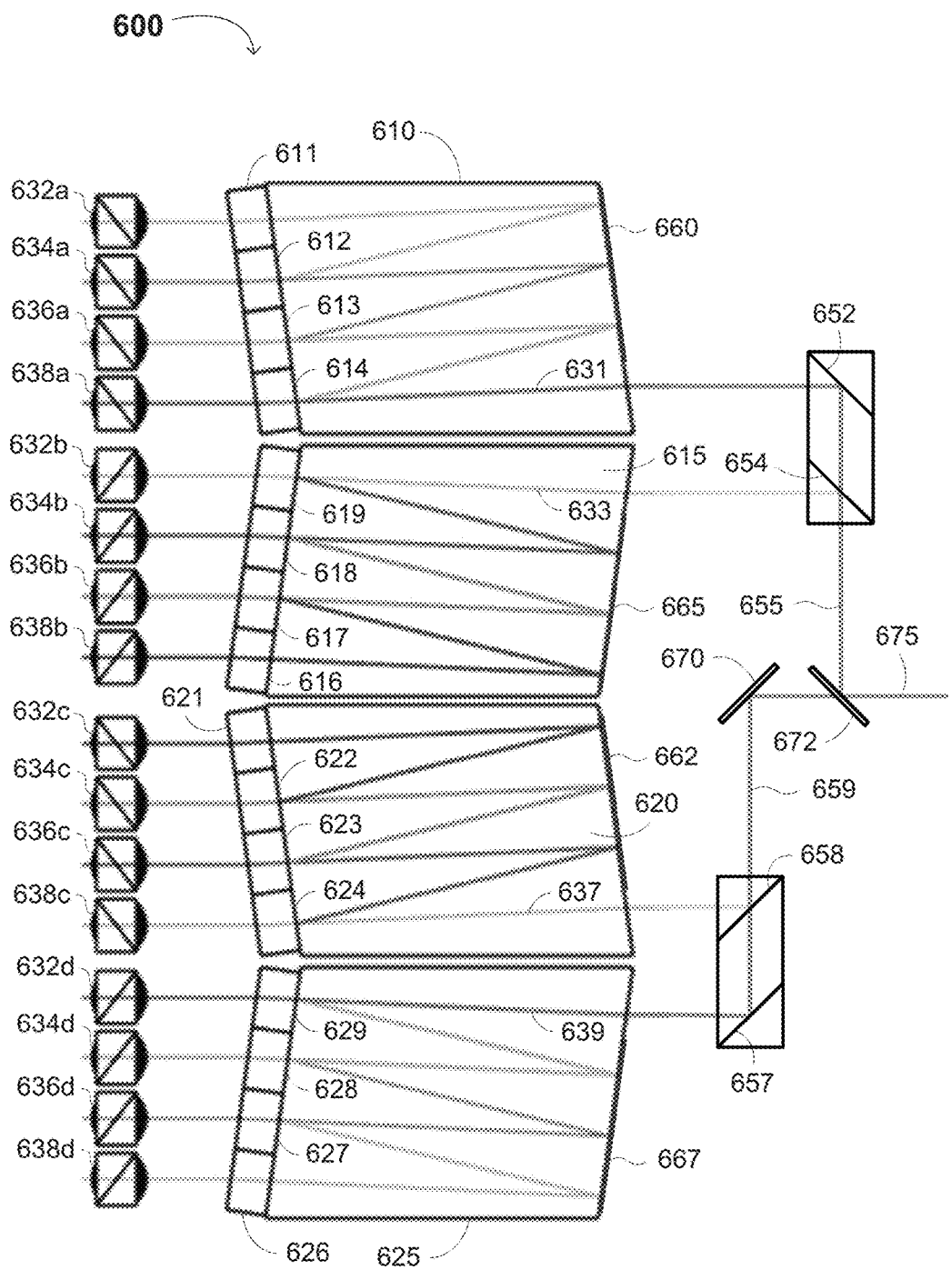
FIG. 7 is a diagram showing a further exemplary 16-channel multiplexer in accordance with one or more embodiments of the present invention.

FIG. 7 shows an exemplary multiplexer 600 according to one or more alternative embodiments of the multiplexer 500 of FIG. 6, including first through fourth structural blocks 610, 615, 620 and 625, first through fourth pluralities of lenses 632a-638d, first through third mirrors 652, 657 and 670, and first through third filters 654, 658 and 672. The first through fourth structural blocks 610, 615, 620 and 625 are identical or substantially identical to first through fourth structural blocks 510, 515, 520 and 525, in that they include respective pluralities of filters 611-614, 616-619, 621-624 and 626-629 and respective mirrors 660, 665, 662 and 667. The filters 611-614, 616-619, 621-624 and 626-629 and mirrors 660, 665, 662 and 667 may be identical or substantially identical to the corresponding structures in FIG. 6.

Similar to the example multiplexers 200, 200', 400 and 400' of FIGS. 3A-B and 5A-B, the 4-channel optical signals 631 and 639 are reflected by the mirrors 652 and 657, respectively, and the 4-channel optical signals 633 and 637 impinge on the spots or locations on the filters 654 and 658, respectively, where the first and fourth 4-channel optical signals 631 and 639 pass through. The mirrors 652 and 657 are generally non-selective, and the filters 654 and 658 generally comprise a highpass, lowpass, or bandpass filter. Alternatively or additionally, the filters 654 and 658 may be polarization-dependent. The 4-channel optical signals 633 and 637 are respectively reflected by the filters 654 and 658, thereby combining the first and second 4-channel optical signals 631 and 633 and the third and fourth 4-channel optical signals 637 and 639 to respectively form 8-channel optical signals 655 and 659.

The 8-channel optical signal 659 is then reflected by the third mirror 670. The mirror 670 is generally non-selective. The 8-channel optical signal 659 passes through the third filter 672. The 8-channel optical signal 655 impinges on the filter 672 at the spot or location on the filter 672 where the 8-channel optical signal 659 passes through, and is reflected by the filter 672 to form a 16-channel output signal 675. The filter 672 may comprise a highpass, lowpass, or bandpass filter and/or a polarization-dependent filter.

In one example, the filter 672 is a highpass or lowpass filter, the optical signals in the first 4-channel optical signal 631 have first through fourth wavelengths $\lambda_1$-$\lambda_4$, the optical signals in the second 4-channel optical signal 633 have fifth through eighth wavelengths $\lambda_5$-$\lambda_8$, the optical signals in the third 4-channel optical signal 637 have ninth through twelfth wavelengths $\lambda_9$-$\lambda_{12}$, and the optical signals in the fourth 4-channel optical signal 639 have thirteenth through sixteenth wavelengths $\lambda_{13}$-$\lambda_{16}$. In such an embodiment, each of the filters 654 and 658 is independently a highpass or lowpass filter, and the differences between adjacent ones of the wavelengths $\lambda_1$-$\lambda_{16}$ may be the same.

The multiplexer 600 in FIG. 7 has substantially the same advantages as the multiplexers 100, 200, 200', 300, 400, 400' and 500 in FIGS. 2-6 (e.g., the geometric error or signal spreading does not accumulate over all of the channels in the optical signal output from the multiplexer, each structural block is adjustable independently, the overall length is about the same as the corresponding 4-, 8- or 16-channel design, the difference in minimum and maximum optical path lengths is the same as the corresponding 4-channel design, etc.). The multiplexer 600 may include additional components in various optical paths, such as one or more additional lenses, bandpass and/or polarization filters, and/or mirrors, similar to the multiplexers 100, 200, 200', 300, 400, 400' and 500 in FIGS. 2-6.

An Exemplary Optical Demultiplexer

Figure 8:
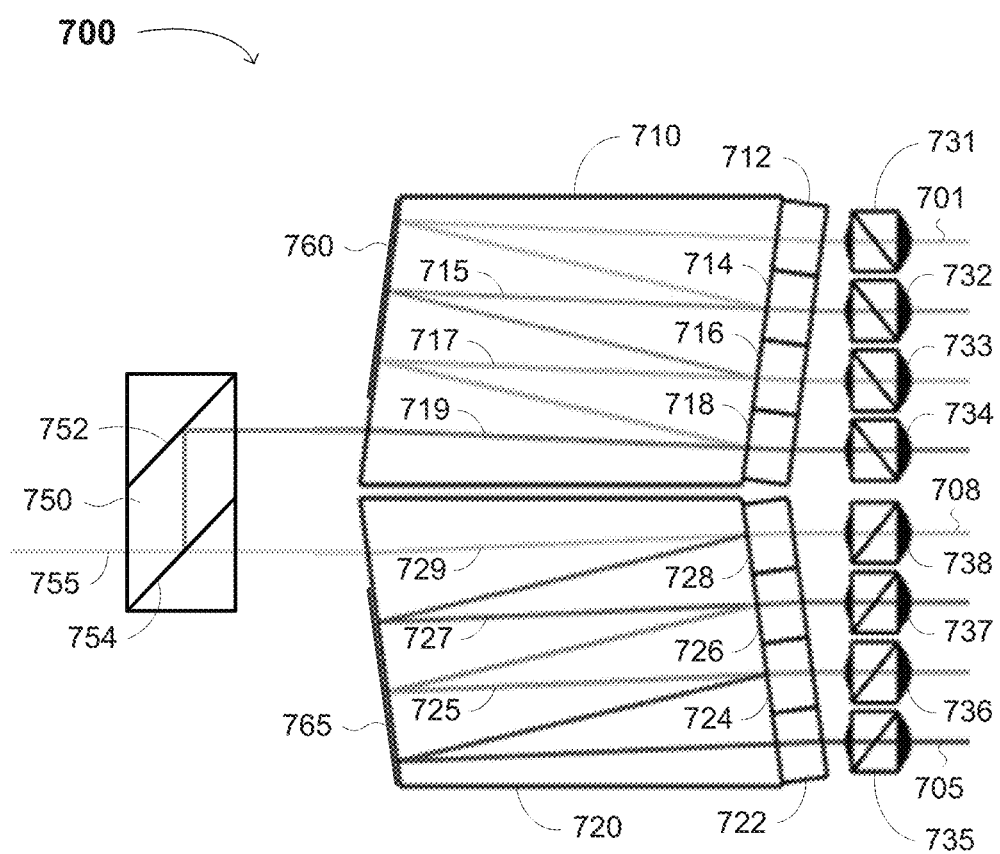
FIG. 8 is a diagram showing an exemplary demultiplexer in accordance with one or more embodiments of the present invention.

The principles behind the present optical multiplexer are also applicable to optical demultiplexers. FIG. 8 shows an exemplary optical demultiplexer 700 according to embodiments of the present invention, including a beam splitter 750, a first structural block 710, a second structural block 720, and a plurality of lenses 731-738. The beam splitter 750 may comprise a structural block comprising a mirror 752 and a filter 754, similar or identical to the beam combiners 250 and 450 in FIGS. 3A and 5A, respectively. The first structural block 710 includes a first plurality of filters 712, 714, 716 and 718 and a first mirror 760. The second structural block 720 includes a second plurality of filters 722, 724, 726 and 728 and a second mirror 765. The filters 712, 714, 716, 718, 722, 724, 726 and 728 in the multiplexer 700 are generally wavelength-selective filters and may comprise a separate component adhered or fixed onto the surface of the first or second structural block 710 or 720, or a coating applied to the surface of the first or second structural block 710 or 720, similar or identical to the first and second structural blocks 210 and 220 in FIG. 3A. The filters 712, 714, 716, 718, 722, 724, 726 and 728 may also include a polarization filter (e.g., if the optical signals 701-708 are or are to be polarized). The filters 712 and 722 are optional, and can be or comprise a high bandpass filter, a low bandpass filter, and/or a polarization filter. The first and second mirrors 760 and 765 are non-selective or total reflectance mirrors, and cover at least the areas or locations where the incoming optical signals 701, 715 and 717 and 705, 725 and 727 respectively impinge, but do not cover the area or location where the incoming 4-channel optical signals 719 and 729 respectively impinge. The first and second structural blocks 710 and 720 and the beam splitter 750 are capable of reducing both the length and the width dimensions of the demultiplexer 700, without affecting the reliability of the optical receiver including the demultiplexer 700.

The demultiplexer 700 operates similarly to the multiplexer 200 in FIG. 3A, but in reverse. An 8-channel optical signal 755 is separated into first and second 4-channel optical signals 719 and 729 by the filter 754 in the beam splitter 750. The second 4-channel optical signal 729 passes through the filter 754, and the first 4-channel optical signal 719 is reflected by the filter 754. The filter 754 may be a highpass or lowpass filter (e.g., one that reflects light above a threshold wavelength and that allows light having wavelength below the threshold wavelength to pass through, or vice versa). Alternatively, the filter 754 may be a bandpass filter (e.g., one that reflects light below a first threshold wavelength and above a second threshold wavelength higher than the first threshold wavelength, but that allows light having a wavelength between the first and second threshold wavelengths to pass through). The 4-channel optical signal 719 is then reflected by mirror 752, which is generally a non-selective mirror (i.e., it reflects substantially all wavelengths of light that may be in the first 4-channel optical signal 719).

In the structural blocks 710 and 720, the 4-channel optical signals 719 and 729 respectively impinge on the fourth and eighth filters 718 and 728. The fourth and eighth single-channel optical signals 704 and 708 pass through the fourth and eighth filters 718 and 728, but the signals 717 and 727 are respectively reflected by the fourth and eighth filters 718 and 728 towards the mirrors 760 and 765. The signals 717 and 727 include the remaining 3 channels of the 4-channel optical signals 719 and 729, respectively. The mirrors 760 and 765 reflect the signals 717 and 727 towards the third and seventh filters 716 and 726. The third and seventh optical signals 703 and 707 pass through the third and seventh filters 716 and 726, and the signals 715 and 725 are reflected. The signals 715 and 725 include the remaining two channels of the 3-channel optical signals 717 and 727, respectively. The mirrors 760 and 765 reflect the signals 715 and 725 towards the second and sixth filters 714 and 724. The first and fifth optical signals 701 and 705 are reflected by the second and sixth filters 714 and 724, but the second and sixth optical signals 702 and 706 respectively pass through the second and sixth filters 714 and 724. The first and fifth optical signals 701 and 705 are reflected by the mirrors 760 and 765 towards the first and fifth filters 712 and 722, where they pass through.

The first through eighth optical signals 701-708 from respective first through eighth filters 712, 714, 716, 718, 722, 724, 726 and 728 are focused and/or collimated by the first through eighth lenses 731-738 onto a corresponding one of first through eighth optical signal detectors (e.g., photodiodes). The first through eighth optical signals 701-208 have different wavelengths. There is a spacing between adjacent wavelengths of the signals 701-708 of at least 0.4 nm (e.g., 0.4 nm, 0.8 nm 2.0 nm, etc.). In some instances, the optical signals 701-708 may have a polarization type that is the same as or different from one or more of the other optical signals 701-208.

The optical demultiplexer 700 in FIG. 8 has substantially the same advantages as the optical multiplexers 100, 200 and 200' in FIGS. 2 and 3A-B, in that any geometric error or signal spreading in the demultiplexer 700 does not accumulate over all of the channels in the optical signal 755, each structural block 710 and 720 is adjustable independently, the overall length of the demultiplexer 700 is about the same as the corresponding 4- or 8-channel design, the difference in minimum and maximum optical path lengths is the same as the corresponding 4-channel design, etc. Similar advantages and benefits may be extended to other demultiplexers, such as 16-channel optical demultiplexers similar to the multiplexers 200', 400, 400' and 600 in FIGS. 3B, 5A-B and 7, but which provide a complementary or reverse function. In addition, the multiplexer 700 may include additional components in various optical paths, such as one or more additional lenses, bandpass and/or polarization filters, and/or mirrors.

An Exemplary Optical Transceiver and/or Optical Module

FIG. 9 is a diagram of an exemplary optical transceiver and/or optical module 800 in accordance with embodiments of the present invention comprises an electrical interface 810, one or more laser drivers 820, a transmitter optical subassembly (TOSA) 830, an optical multiplexer 840, a microprocessor or microcontroller (e.g., MCU) 850, an optical demultiplexer 860, a receiver optical subassembly (ROSA) 870 and a limiting amplifier 880 coupled in sequence, and a temperature control circuit 890. The TOSA 830 comprises a plurality of laser diodes (LDs) 832, a corresponding plurality of modulators 834 and a corresponding plurality of monitoring photodiodes (MPDs) 836. The ROSA 870 generally includes a plurality of photodiodes (PDs) 872 configured to receive optical signals from a network (e.g., sent over an optical fiber) and convert the optical signals to electrical signals, and optionally, one or more transimpedance amplifiers 874 configured to amplify the electrical signals. The limiting amplifiers 880 is configured to amplify the signals received from the ROSA 870.

In the transmitter path of the optical transceiver and/or module 800, the laser drivers 820 receive electrical data signals from the electrical interface 810 and send data driving signals or pulses to the modulators 834. The electrical interface 880 may receive the data signals from a host device and may comprise, for example, conventional golden finger connectors. The LDs 832 receive a bias signal or voltage from the bias control circuit 825. Alternatively, the LDs 832 may receive the data driving signals or pulses directly the laser drivers 820, in which case the modulators 834 may not be needed. The MPDs 836 are connected to the MCU 850 via one or more analog-to-digital converter (ADC) circuits or modules 855. Thus, the MCU 850 may receive a digital signal (e.g., a voltage) corresponding to the value of a feedback current from each of the MPDs 836, which may be useful for comparing to one or more thresholds or voltages representative of a target and/or maximum value of the operating range of the laser drivers 820. The MPDs 836, analog-to-digital converters 855, MCU 850 and laser drivers 820 may form a closed loop automatic power control (APC) regulating loop for maintaining a target optical output power from the LDs 832.

The TOSA 830 (i.e., either the modulators 834 or the LDs 832) outputs a plurality of optical signals that are combined by the optical multiplexer 840 as described herein with regard to the multiplexers 100, 200', 300, 300', 400, 400', 500 and 600 in FIGS. 1-7. The example multiplexer 840 comprises first and second structural blocks 842 and 844 and a beam combiner 846. In further embodiments, the multiplexer 840 may further include a plurality of lenses as described herein, and the first and second structural blocks 842 and 844 may include respective first and second pluralities of filters and first and second mirrors, as described herein. The beam combiner 846 may comprise one or more mirrors and one or more filters, as described herein.

As shown in FIG. 9, the first and second structural blocks 842 and 844 each combine four optical signals to create a 4-channel optical signal. The two 4-channel optical signals are then combined by the beam combiner 846 to form an 8-channel optical output signal. However, the first and second structural blocks 842 and 844 may combine a different number of optical signals, and the beam combiner 846 may output an optical signal having a different number of channels. Furthermore, the optical multiplexer 840 may further include one or more waveplates as described herein when one or both of the multi-channel optical signals output by the first and second structural blocks 842 and 844 include only signals having a particular polarization type (e.g., s-polarization or p-polarization).

In the receiver path of the optical transceiver and/or module 800, the optical demultiplexer 860 receives an incoming multi-channel optical signal. Like the optical demultiplexer 700 in FIG. 8, the optical demultiplexer 860 comprises a beam splitter 866 and third and fourth structural blocks 862 and 864. In further embodiments, the demultiplexer 860 may further include a plurality of lenses as described with regard to FIG. 8, and the third and fourth structural blocks 862 and 864 may include respective third and fourth pluralities of filters and third and fourth mirrors, as described with regard to FIG. 8. The beam splitter 866 may comprise one or more mirrors and one or more filters, as described with regard to the optical demultiplexer 700 in FIG. 8.

As shown in FIG. 9, an 8-channel optical input signal is separated into two 4-channel optical signals by the beam splitter 866. Each 4-channel optical signal is then demultiplexed into individual optical signals by the third and fourth structural blocks 862 and 864, as described herein. However, the beam splitter 866 may receive an optical signal having a different number of channels, and the third and fourth structural blocks 862 and 864 may receive and demultiplex a different number of optical signals.

The PDs 872 receive the individual optical signals and convert them into electrical signals that are amplified by the TIAs 874. The amplified electrical signals output by the TIAs 874 may then be further amplified by the limiting amplifiers 880 prior to transmission by or from the electrical interface 810 (e.g., to the host).

The MCU 850 controls the power of the data signals from the laser drivers 820, the voltage or current of the bias signal provided by the bias control circuit 825, and the gain(s) of the TIAs 874 and/or limiting amplifier 870. The MCU 850 also controls the temperature control circuit 890, which in turn controls the temperature of the LDs 832 and optionally the modulators 834. Generally, the temperature of the LDs 832 and the modulators 834 may be controlled by regulating the power supplied to them (e.g., when the temperature of the LDs 832 is too high, the bias from the bias control circuit may be reduced, and when the temperature of the LDs 832 is too low, the bias from the bias control circuit may be increased). The same or different temperature control circuit may control the temperature of the PDs 872.

Exemplary Methods of Making an Optical Multiplexer or Optical Demultiplexer

Yet another aspect of the present invention involves a method of making an optical multiplexer or an optical demultiplexer. The method of making an optical multiplexer comprises placing a first structural block and a second structural block in locations such that respective first and second multi-channel optical signals from the first and second structural blocks can be combined with a beam combiner, placing the beam combiner or components thereof in locations that combine the first and second multi-channel optical signals into a third multi-channel optical signal, and securing the first structural block, the second structural block and the beam combiner, beam splitter or components thereof when the first structural block, the second structural block and the beam combiner or components thereof are in locations in which the optical multiplexer combines the first and second multi-channel optical signals into the third multi-channel optical signal. The first structural block comprises at least one first mirror and at least one first filter, the second structural block comprises at least one second mirror and at least one second filter, and the beam combiner or components thereof comprise one or more third mirrors and one or more third filters. The third multi-channel optical signal has a number of channels equal to the sum of the channels of the first and second multi-channel optical signals.

The method of making an optical demultiplexer is similar, in that it comprises placing a first structural block and a second structural block in locations such that respective first and second multi-channel optical signals received from a beam splitter can be separated into respective first and second pluralities of individual optical signals, placing the beam splitter or components thereof in locations that separate the third multi-channel optical signal into the first and second multi-channel optical signals, and securing the first structural block, the second structural block and the beam splitter or components thereof when the first structural block, the second structural block and the beam splitter or components thereof are placed in locations in which the optical demultiplexer separates the third multi-channel optical signal into the first and second pluralities of individual optical signals.

In further embodiments, the methods may further comprise testing the optical multiplexer or optical demultiplexer to ensure operability and/or maximize a signal strength(s) of the third multi-channel optical signal or the separated individual (i.e., single-channel) optical signals. The first and second structural blocks and the beam combiner, beam splitter or components thereof are secured when the optical multiplexer or optical demultiplexer are operable and/or the signal strength(s) are maximized. For example, in the present methods of making, the first and second structural blocks, the beam combiner, beam splitter or components thereof, and any other components of the optical multiplexer or demultiplexer in the optical path of an optical signal may be placed in predetermined positions and/or locations in the package or housing (or in the optical cavity thereof), and after testing, when the signal strength of the first, second and/or third multichannel optical signal or the separated single-channel optical signals is below a predetermined threshold (or is not at a maximum value), the positions and/or locations of one or more of the first and second structural blocks, the beam combiner, beam splitter or components thereof, and other components of the optical multiplexer or demultiplexer may be adjusted. The first and second structural blocks, the beam combiner, beam splitter or components thereof, and other components of the optical multiplexer or demultiplexer are secured when the received signal strength is equal to or above the predetermined threshold or is at the maximum value.

In various embodiments, the first and second structural blocks and the beam combiner, beam splitter or components thereof (as well as other components of the optical multiplexer or demultiplexer) are secured to a mounting surface in or on the package or housing, or in or on a wall of an optical cavity inside the package or housing. For example, the methods may further comprise placing a plurality of lenses (e.g., a focusing lens) in the optical paths of the individual optical signals, between the first and second structural blocks and the corresponding optical transmitters (e.g., laser diodes). In additional or alternative embodiments, the methods may further comprise placing, forming and/or securing the filter(s) and mirror(s) on or onto the first and second structural blocks. The methods may further comprise placing, forming and/or securing a filter and at least one mirror on or onto a third structural block to form the beam combiner or beam splitter.

In some embodiments, the method may further comprise placing a separate lens (e.g., a collimating lens), a beam splitter, a mirror (which may be a simple or non-selective mirror) and/or a plurality of optical transmitters in the package or housing (or in the optical cavity thereof). The separate lens may be placed in a position or location proximate to an optical fiber connector (e.g., in the optical path between the optical fiber connector and the optical multiplexer or demultiplexer). The beam combiner or beam splitter may be placed in a position or location in the optical path between (1) the optical fiber connector and/or the second lens and (2) the first and second structural blocks. In many embodiments, the method further comprises forming the optical fiber connector at a first end of the package or housing (or the optical cavity). The mirror may be placed in a position or location receiving the output or incoming multi-channel optical signal, and have dimensions adapted for further reflecting the output or incoming multi-channel optical signal towards (i) the first and second structural blocks (in the case of the optical demultiplexer) or (ii) the separate lens (in the case of the optical multiplexer). The optical transmitters may each comprise a laser diode (e.g., a tunable distributed feedback [DFB] laser diode, an electro-modulated laser [EML], etc.)

Exemplary Methods of Using an Optical Multiplexer or Optical Demultiplexer

Yet a further aspect of the present invention involves a method of forming a multi-channel optical output signal, comprising combining a first plurality of individual optical signals into a first multi-channel optical signal using a first structural block, combining a second plurality of individual optical signals into a second multi-channel optical signal using a second structural block, and combining the first and second multi-channel optical signals into a third multi-channel optical signal using a using a second structural block. The first structural block comprises at least one first mirror and at least one first filter, the second structural block comprises at least one second mirror and at least one second filter, and the beam combiner comprises one or more third mirrors and one or more third filters. The third multi-channel optical signal is, or is at least a component of, the multi-channel optical output signal. For example, the third multi-channel optical signal may be combined with one or more additional multi-channel optical signals before being output by the optical multiplexer.

In further embodiments, the first structural block may comprise a first parallelogram-shaped block. The first mirror(s) may be on a distal side of the first parallelogram-shaped block (i.e., away from the optical transmitters), and the first filter(s) may be on a near side of the first parallelogram-shaped block (i.e., nearer to the optical transmitters). Additionally or alternatively, the second structural block may comprise a second parallelogram-shaped block, in which case the second mirror(s) may be on a distal side of the second parallelogram-shaped block, and the second filter(s) are on a near side of the second parallelogram-shaped block. Furthermore, parallel sides of the first parallelogram-shaped block may be parallel or substantially parallel to parallel sides of the second parallelogram-shaped block.

In even further embodiments, combining the first plurality of individual optical signals comprises passing each of the first plurality of individual optical signals through a corresponding first filter and reflecting all but one of the first plurality of individual optical signals towards an adjacent first filter using the first mirror(s). Additionally or alternatively, combining the second plurality of individual optical signals may comprise passing each of the second plurality of individual optical signals through a corresponding second filter and reflecting all but one of the second plurality of individual optical signals towards an adjacent second filter using the second mirror(s).

In some embodiments, the beam combiner comprises a third parallelogram-shaped block, the third mirror(s) comprise a non-selective mirror on a first surface of the third parallelogram-shaped block, and the third filter(s) comprise a wavelength-dependent and/or polarization-dependent filter on a second surface of the third parallelogram-shaped block parallel to the first surface of the third parallelogram-shaped block. Furthermore, in general, the method may further comprise passing each of the first and second pluralities of individual optical signals through a corresponding lens before the first and second pluralities of individual optical signals enter the first and second structural blocks.

Alternatively, the present invention relates to a method of separating an incoming multi-channel optical output signal into its individual optical signals, comprising separating the incoming multi-channel optical signal into first and second multi-channel optical signals using a beam splitter comprising one or more mirrors and one or more filters, separating the first multi-channel optical signal into a first plurality of individual optical signals using a first structural block comprising at least one mirror and a plurality of filters, and separating the second multi-channel optical signal into a second plurality of individual optical signals using a second structural block comprising at least one mirror and a plurality of filters. The number of individual optical signals in the first and second pluralities of individual optical signals is the same as the number of channels in the incoming multi-channel optical signal.

Like the method of forming a multi-channel optical output signal, the first and second structural blocks may comprise respective first and second parallelogram-shaped blocks. However, the mirror(s) may be on a near side of the parallelogram-shaped block (i.e., away from the optical transmitters), the filter(s) may be on a distal side of the first parallelogram-shaped block (i.e., nearer to the optical transmitters), and parallel sides of the first parallelogram-shaped block may be parallel or substantially parallel to parallel sides of the second parallelogram-shaped block. In some embodiments, the beam splitter comprises a third parallelogram-shaped block, the third mirror(s) comprise a non-selective mirror on a first surface of the third parallelogram-shaped block, and the third filter(s) comprise a wavelength-dependent and/or polarization-dependent filter on a second surface of the third parallelogram-shaped block parallel to the first surface of the third parallelogram-shaped block.

In further embodiments, separating the first and/or second multi-channel optical signals into corresponding individual optical signals comprises passing one of the individual optical signals through a corresponding one of the filters in the structural block and reflecting the remaining individual optical signals towards the mirror(s), where the remaining individual optical signals are reflected towards an adjacent one of the filters. Optionally, the last remaining individual optical signal can be reflected to a corresponding last one of the optical signal detectors. Furthermore, in general, the method may further comprise passing each of the first and second pluralities of individual optical signals through a corresponding lens before the first and second pluralities of individual optical signals enter the first and second structural blocks.

CONCLUSION/SUMMARY

Embodiments of the present invention advantageously provide an optical multiplexer and demultiplexer, an optical module including at least one of the same, and methods for making and using such optical multiplexers and demultiplexers. The present optical multiplexer and demultiplexer reduce accumulation of the geometric error (e.g., in optical signal alignment) over the channels in the multi-channel optical signal output from the multiplexer or input into the demultiplexer relative to the prior art. In addition, each structural block in the present optical multiplexer and demultiplexer is adjustable independently. Furthermore, the overall length of the multiplexer and demultiplexer is about the same as the corresponding design having half or fewer of the channels. Furthermore, the difference in minimum and maximum optical paths (e.g., the skew between the shortest and longest optical signal paths) is the same as the corresponding design having half or fewer of the channels.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical multiplexer, comprising: a first structural block comprising at least one first mirror and at least one first filter, the first structural block being configured to combine a first plurality of individual optical signals into a first multi-channel optical signal comprising a first number of channels; a second structural block comprising at least one second mirror and at least one second filter, the second structural block being configured to combine a second plurality of individual optical signals into a second multi-channel optical signal comprising a second number of channels; and a beam combiner comprising a first parallelogram-shaped block, a first non-selective mirror on a first surface of the first parallelogram-shaped block, and a wavelength-selective and/or polarization-dependent filter on a parallel surface of the first parallelogram-shaped block, the beam combiner being configured to combine the first and second multi-channel optical signals into a third multi-channel optical signal, and the third multi-channel optical signal having a third number of channels equal to a sum of the first number of channels and the second number of channels, wherein the wavelength-selective and/or polarization-dependent filter is configured to reflect the first multi-channel optical signal and allow the second multi-channel optical signal to pass through, and the first non-selective mirror is configured to reflect the first multi-channel optical signal towards the wavelength-selective and/or polarization-dependent filter.

2. The optical multiplexer of claim 1, wherein the first structural block comprises a second parallelogram-shaped block, the second structural block comprises a third parallelogram-shaped block, and parallel sides of the second parallelogram-shaped block are parallel to parallel sides of the third parallelogram-shaped block.

3. The optical multiplexer of claim 2, wherein said at least one first mirror is on a distal side of the first transparent second parallelogram-shaped block, said at least one second mirror is on a distal side of the second transparent third parallelogram-shaped block, said at least one first filter is on a near side of the first transparent second parallelogram-shaped block, and said at least one second filter is on a near side of the second transparent third parallelogram-shaped block.

4. The optical multiplexer of claim 2, wherein each of the first, second and third parallelogram-shaped blocks is transparent.

5. The optical multiplexer of claim 1, further comprising a plurality of lenses through which the first and second pluralities of individual optical signals pass before entering the first and second structural blocks.

6. The optical multiplexer of claim 1, wherein the one or more third mirrors beam combiner further comprises a second non-selective mirror configured to reflect the third multi-channel optical signal towards a further target.

7. The optical multiplexer of claim 1, wherein the first multi-channel optical signal has a first polarization type, the second multi-channel optical signal has a second polarization type that is identical to or different from the first polarization type, and the optical multiplexer further comprises a first waveplate configured to change a polarization angle of said first multi-channel optical signal.

8. The optical multiplexer of claim 7, further comprising a second waveplate configured to change a polarization angle of said second multi-channel optical signal, wherein the one or more third filters comprises a polarization-dependent filter.

9. The optical multiplexer of claim 1, wherein each of said individual optical signals has a wavelength that differs from a wavelength of an adjacent one of the individual optical signals by at least 0.4 nm.

10. The optical multiplexer of claim 1, wherein the at least one first filter comprises at least three first filters, the at least one second filter comprises at least three second filters, and each of the structural blocks is configured to combine at least four individual optical signals into a corresponding multi-channel optical signal.

11. An optical module, comprising:
the optical multiplexer of claim 1;
a plurality of optical or optoelectronic transmitters configured to provide the first and second pluralities of individual optical signals;
a fiber adapter or connector configured to receive an optical fiber, the optical fiber receiving the third multi-channel optical signal from the transmitter optical multiplexer; and
a package or housing including the optical multiplexer and the plurality of optical or optoelectronic transmitters.

12. The optical module of claim 11, further comprising an optical demultiplexer configured to separate an incoming multi-channel optical signal into a plurality of individual incoming optical signals, and a plurality of optical or optoelectronic receivers configured to convert a unique one of the plurality of individual incoming optical signals into an electronic signal.

13. An optical demultiplexer, comprising: a beam splitter comprising a first parallelogram-shaped block, a non-selective mirror on a first surface of the first parallelogram-shaped block, and a wavelength-selective and/or polarization-dependent filter on a parallel surface of the first parallelogram-shaped block, the beam splitter being configured to separate a first multi-channel optical signal into second and third multi-channel optical signals, the first multi-channel optical signal having a first number of channels equal to a sum of a second number of channels of the second multi-channel optical signal and a third number of channels of the third multi-channel optical signal, the wavelength-selective and/or polarization-dependent filter being configured to reflect the third multi-channel optical signal and allow the second multi-channel optical signal to pass through, and the non-selective mirror being configured to reflect the third multi-channel optical signal from the wavelength-selective and/or polarization-dependent filter; a first structural block comprising at least one second mirror and at least one second filter, the first structural block being configured to separate the second multi-channel optical signal into a first plurality of individual optical signals; and a second structural block comprising at least one third mirror and at least one third filter, the second structural block being configured to separate the third multi-channel optical signal into a second plurality of individual optical signals.

14. The optical demultiplexer of claim 13, wherein the first structural block comprises a first second parallelogram-shaped block, the second structural block comprises a second third parallelogram-shaped block, and parallel sides of the first transparent second parallelogram-shaped block are parallel to parallel sides of the second transparent third parallelogram-shaped block.

15. The optical demultiplexer of claim 14, wherein said at least one second mirror is on a near side of the first transparent second parallelogram-shaped block, said at least one third mirror is on a near side of the second transparent third parallelogram-shaped block, said at least one second filter is on a distal side of the first transparent second parallelogram-shaped block, and said at least one third filter is on a distal side of the second transparent third parallelogram-shaped block.

16. The optical demultiplexer of claim 13, wherein the at least one second filter comprises at least three second filters, the at least one third filter comprises at least three third filters, and each of the structural blocks is configured to split the corresponding multi-channel optical signal into at least four individual optical signals.

17. The optical demultiplexer of claim 13, wherein the first structural block comprises a second parallelogram-shaped block, the second structural block comprises a third parallelogram-shaped block, and parallel sides of the third parallelogram-shaped block are parallel to parallel sides of the second parallelogram-shaped block.

18. The optical demultiplexer of claim 17, wherein each of the first, second and third parallelogram-shaped blocks is transparent.

19. A method of forming a multi-channel optical output signal, comprising: combining a first plurality of individual optical signals into a first multi-channel optical signal using a first structural block comprising at least one first mirror and at least one first filter; combining a second plurality of individual optical signals into a second multi-channel optical signal using a second structural block comprising at least one second mirror and at least one second filter; and combining the first and second multi-channel optical signals into a third multi-channel optical signal using a beam combiner comprising a non-selective mirror on a first surface of a first parallelogram-shaped block and a wavelength-dependent and/or polarization-dependent filter on a parallel surface of the first parallelogram-shaped block, wherein the third multi-channel optical signal is at least a component of the multi-channel optical output signal.

20. The method of claim 19, wherein: the first structural block comprises a second parallelogram-shaped block, said at least one first mirror is on a distal side of the second transparent parallelogram-shaped block, and said at least one first filter is on a near side of the second parallelogram-shaped block; the second structural block comprises a third parallelogram-shaped block, said at least one second mirror is on a distal side of the third parallelogram-shaped block, and said at least one second filter is on a near side of the third parallelogram-shaped block; and parallel sides of the second parallelogram-shaped block are parallel to parallel sides of the third parallelogram-shaped block.

21. The method of claim 20, wherein:
combining said first plurality of individual optical signals comprises passing each of said first plurality of individual optical signals through a corresponding first filter and reflecting all but one of said first plurality of individual optical signals towards an adjacent first filter using said at least one first mirror; and
combining said second plurality of individual optical signals comprises passing each of said second plurality of individual optical signals through a corresponding second filter and reflecting all but one of said second plurality of individual optical signals towards an adjacent second filter using said at least one second mirror.

22. The method of claim 19, further comprising passing each of the first and second pluralities of individual optical signals through a corresponding lens before the first and second pluralities of individual optical signals enter the first and second structural blocks.

23. An optical multiplexer, comprising: a first structural block comprising at least one first mirror and at least one first filter, the first structural block being configured to combine a first plurality of individual optical signals into a first multi-channel optical signal comprising a first number of channels; a second structural block comprising at least one second mirror and at least one second filter, the second structural block being configured to combine a second plurality of individual optical signals into a second multi-channel optical signal comprising a second number of channels; a third structural block comprising at least one third mirror and at least one third filter, the third structural block being configured to combine a third plurality of individual optical signals into a third multi-channel optical signal; and a beam combiner comprising one or more fourth mirrors, a first wavelength-selective and/or polarization-dependent filter configured to combine the first and second multi-channel optical signals into a fourth multi-channel optical signal, and a second wavelength-selective and/or polarization-dependent filter configured to combine the third and fourth multi-channel optical signals into a fifth multi-channel optical signal, the fourth multi-channel optical signal having a third number of channels equal to a sum of the first number of channels and the second number of channels, and the fifth multi-channel optical signal having a number of channels equal to a sum of the third and fourth multi-channel optical signals.

24. The optical multiplexer of claim 23, wherein the one or more third filters comprises a first wavelength-selective and/or polarization-dependent filter is configured to reflect the first multi-channel optical signal and allow the second multi-channel optical signal to pass through, and the one or more third fourth mirrors comprises a first non-selective mirror configured to reflect the first multi-channel optical signal towards the wavelength-selective and/or polarization-dependent filter.

25. The optical multiplexer of claim 24, wherein the beam combiner comprises a third parallelogram-shaped block, the non-selective mirror is on a first surface of the third transparent parallelogram-shaped block, and the wavelength-selective and/or polarization-dependent filter is on a parallel surface of the third parallelogram-shaped block.

\* \* \* \* \*